United States Patent [19]
Pelletier et al.

[11] Patent Number: 5,642,005
[45] Date of Patent: Jun. 24, 1997

[54] METHOD FOR INTERCONNECTING TWO SYNCHRONOUS POLYPHASE AC NETWORKS AND INTERCONNECTING APPARATUS FOR THE SAME

[75] Inventors: Pierre Pelletier; Jacques Brochu; François Beauregard, all of Boucherville; Gaston Morin, Carignan, all of Canada

[73] Assignee: CITEQ, Varennes, Canada

[21] Appl. No.: 244,922

[22] PCT Filed: Jan. 26, 1994

[86] PCT No.: PCT/CA91/00041

§ 371 Date: Nov. 8, 1994

§ 102(e) Date: Nov. 8, 1994

[87] PCT Pub. No.: WO94/17579

PCT Pub. Date: Aug. 4, 1994

[51] Int. Cl.⁶ .................................................. H02J 1/00
[52] U.S. Cl. .............................. 307/87; 307/19; 307/44; 307/83
[58] Field of Search .................... 307/18–29, 44, 307/45, 64, 65, 66, 82, 83, 85, 86, 87, 72, 113, 115; 323/209, 210, 211

[56] References Cited

U.S. PATENT DOCUMENTS

| | | | |
|---|---|---|---|
| 4,621,198 | 11/1986 | Roberge et al. | 307/82 |
| 4,890,213 | 12/1989 | Seki | 363/49 |
| 4,983,856 | 1/1991 | Pelletier | 307/20 |
| 5,212,407 | 5/1993 | Gaddis et al. | 307/87 |

OTHER PUBLICATIONS

Hingorani, "Flexible AC Transmission Systems (FACTS)—Overview", IEEE Winter Power Meeting, pp. 1–5, (1990) Feb. 7, 1990.

Gyugyi, "Solid–State Control of AC Power Transmission", Westinghous Electric Corporation, pp. 1–26 and FIGS. 1–12 1990.

Maliszewski et al., "Power Flow Control In A Highly Integrated Transmission Network", Cigre, pp. 1–9, (1990) Session Aug. 26, 1990.

Falcone, "Electric Utility Industry Structure In The United States", *IEEE Power Engineering Review*, pp. 13–17, (1992) Apr. 1992.

Larsen, "Control Aspects Of Facts Applications", GE Industrial and Power Systems, Power Systems Engineering Department, pp. 1–19 Nov. 14, 1990.

Mittelstadt, "Considerations In Planning Use Of Facts Devices On A Utility System", Bonneville Power Administration, pp. 1–11, Nov. 14, 1990.

*Primary Examiner*—David S. Martin
*Assistant Examiner*—Jonathan S. Kaplan
*Attorney, Agent, or Firm*—Foley & Lardner

[57] ABSTRACT

The method of interconnecting first and second synchronous polyphase AC networks is for regulating transfer of active power from one of the AC networks to the other. The method involves the steps of, for each phase line of the first AC network, connecting a first end of a first reactive element to the phase line of the first AC network; connecting a first end of a second reactive element to the phase line of the first AC network; applying to a second end of the first reactive element a first phase voltage derived from a second AC network; applying to a second end of the second reactive element a second phase voltage derived from the second AC network, the second phase voltage being phase shifted with respect to the first phase voltage. In a preferred method according to the invention, one of the reactive elements is inductive, and the other of the reactive elements is capacitive. In operation, a phase shift between the first and the second phase voltages forces a regulated transfer of active power from one of the AC networks to the other. Also provided is an interconnecting apparatus for the same purpose.

40 Claims, 30 Drawing Sheets

FIG. 18
| OPERA-TING POINT | REACTIVE ELEMENT IN SERVICE | | ACTIVE AND REACTIVE POWER AT NOMINAL CONDITIONS (V=1.0 p.u. & δ=0°) | | |
|---|---|---|---|---|---|
| | $B_1(L)$ | $B_2(C)$ | P (MW) | Qs (Mvar) | Qr (Mvar) |
| 1 | | | 0 | 0 | 0 |
| 2 | • | | 0.47 | -0.28 | -0.28 |
| 3 | | • | 0.53 | 0.31 | 0.31 |
| 4 | • | • | 1.0 | 0.1 | 0 |
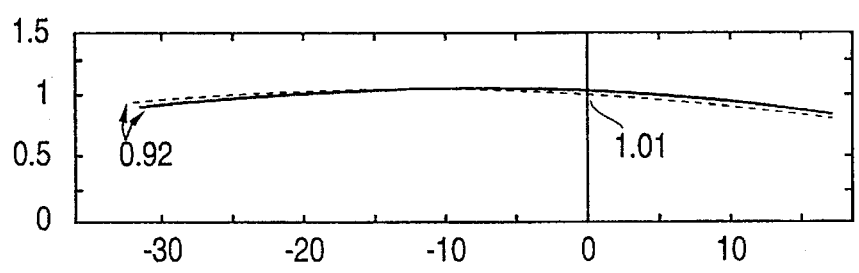
FIG. 19
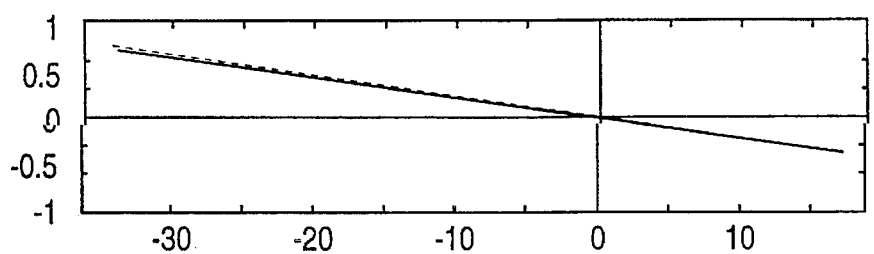
FIG. 20
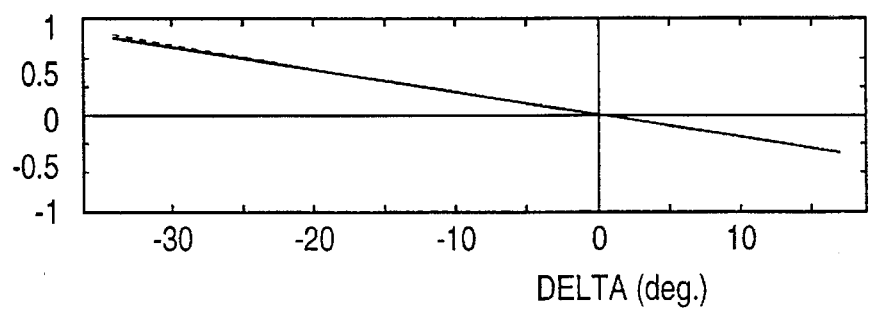
FIG. 21

FIG. 26

| OPERATING POINT | REACTIVE ELEMENT IN SERVICE | | | | ACTIVE AND REACTIVE POWER AT NOMINAL CONDITIONS (120 kV & δ = 0°) | | | CON-JUGATED MODES |
|---|---|---|---|---|---|---|---|---|
| | $B_1$ (L) | | $B_2$ (C) | | $P_{sr}$ (MW) | $Q_s$ (Mvar) | $Q_r$ (Mvar) | |
| | Bit 1 | Bit 0 | Bit 1 | Bit 0 | | | | |
| 1 | | | | | 0 | 0 | 0 | |
| 2 | | • | | | 33 | -19 | -19 | |
| 3 | | | | • | 34 | 20 | 20 | |
| 4 | • | | | | 64 | -37 | -37 | |
| 5 | | • | | • | 67 | 2 | 0 | 1 |
| 6 | | | • | | 69 | 40 | 40 | |
| 7 | • | • | | | 95 | -55 | -55 | |
| 8 | • | | | • | 98 | -15 | -19 | |
| 9 | | • | • | | 102 | 24 | 20 | |
| 10 | | | • | • | 106 | 61 | 61 | |
| 11 | • | • | | • | 128 | -31 | -37 | |
| 12 | • | | • | | 133 | 9 | 0 | 2 |
| 13 | | • | • | • | 139 | 47 | 40 | |
| 14 | • | • | • | | 164 | -6 | -19 | |
| 15 | • | | • | • | 170 | 33 | 20 | |
| 16 | • | • | • | • | 200 | 20 | 0 | 3 |

| | POWER FLOW | |
|---|---|---|
| | S → R | R → S |
| $\delta = -15°$ |  ① |  ② |
| $\delta = 0°$ |  ③ |  ④ |
| $\delta = +15°$ |  ⑤ |  ⑥ |

FIG. 34

| POWER FLOW | δ (Deg.) | VOLTAGES (kVrms) | | CURRENTS (kArms) | | REF. (FIG. 33) |
|---|---|---|---|---|---|---|
| | | $B_1$ (L) | $B_2$ (C) | $B_1$ (L) | $B_2$ (C) | |
| S → R | -25. | 40.6 | 110.3 | 0.326 | 0.884 | |
| | -15. | 52.5 | 99.9 | 0.421 | 0.801 | ① |
| | 0. | 69.8 | 82.9 | 0.559 | 0.665 | ③ |
| | 15. | 85.8 | 64.6 | 0.688 | 0.518 | ⑤ |
| S ← R | -15. | 85.8 | 64.5 | 0.688 | 0.517 | ② |
| | 0. | 69.7 | 82.9 | 0.559 | 0.664 | ④ |
| | 15. | 52.4 | 99.8 | 0.42 | 0.801 | ⑥ |
| | 25. | 40.5 | 110.2 | 0.325 | 0.884 | |

| V | | | E | | |
|---|---|---|---|---|---|
| $V_L$ (kV$_p$) | $V_C$ (kV$_p$) | $V_{TER}$ ph -ph (kV$_p$) | $E_{ZnO}$ "S" (MJ) | $E_{ZnO}$ "SEC" (MJ) | $E_{ZnO}$ "R" (MJ) |
| 329 | 342 | 37 | 12.9 | 20.6 | 0.1 |

METHOD FOR INTERCONNECTING TWO SYNCHRONOUS POLYPHASE AC NETWORKS AND INTERCONNECTING APPARATUS FOR THE SAME

BACKGROUND OF THE INVENTION

1. Field of the Invention

The invention relates to a method of interconnecting first and second synchronous polyphase AC networks having respectively phase lines for regulating transfer of active power from one of said AC networks to the other of said AC networks. The invention also relates to a passive interconnecting apparatus for the same purpose.

2. Brief Description of the Related Art

Known in the art, there are U.S. Pat. Nos. 4,983,856 (PELLETIER) and 4,621,198 (ROBERGE et al.); and N. G. Hingorani, "Flexible AC Transmission Systems (FACTS)-Overview", Panel Session on FACTS, IEEE Winter Power Meeting, Atlanta, 1990; L. Gyugyi, "Solid-State Control of AC transmission", Panel Session on FACTS, IEEE Winter Power Meeting, Atlanta, 1990; R. M. Maliszewski et al, "Power Flow Control in a Highly Integrated Transmission Network", CIGRE 1990 session 37-303; C. A. Falcone, "Electric Utility Industry Structure in the United States", IEEE Power Engineering Review, April 1992; E. V. Larsen, "Control aspects of FACTS applications", EPRI Workshop on FACTS, the future in High-Voltage Transmission, Nov. 14–16, 1990; and W. A. Mittelstadt, "Considerations in planning use of FACTS devices on a utility system", EPRI Workshop on FACTS, the future in High-Voltage Transmission, Nov. 14–16, 1990, which all relate to Flexible AC Transmission Systems (FACTS). FACTS most often designates thyristor-based systems characterized by static and dynamic control of the power flow and/or voltage. Over the past years, FACTS have been increasingly considered to solve power transmission problems and to manage more efficiently the energy exchanges between various partners. The main advantage of FACTS is that they can be applied to existing networks in order to achieve greater performance and can be implemented progressively. Generally, FACTS are thyristor or GTO (Gate Turn-Off) applications using sophisticated controls. They comprise static vat compensators, thyristor-controlled series capacitors, thyristor-switched phase shifters, and even generalized phase-shifter/voltage regulators. They require mechanical or electronic switches as well as a closed-loop controller in order to achieve the power control.

The purpose of these technologies is to facilitate the supply of loads in flexible and rapid fashion, while providing optimal management of electrical networks. In most cases, they allow a "controlled flow", thus removing some of the constraints of the "free flow" of power. In some cases, they are used to interconnect non-synchronous networks.

Under the current free flow mode, some problems encountered essentially involve regulating the power flow in steady state. However, certain networks may be sensitive to daily or seasonal load variations and may require additional reactive power to adjust their voltages. Other networks may require fast control of voltage and power at different points in the network in order to maintain stability.

OBJECT OF THE INVENTION

It is therefore an object of the invention to provide a method of interconnecting and a passive interconnecting apparatus, for regulating power transfer between two synchronous AC networks in a passive fashion by comparison with the prior art devices and methods which involve specific control and operation in an active fashion.

It is another object of the invention to provide such a method of interconnecting and a passive interconnecting apparatus, which maintain a power flow nearly constant for a relatively wide range of phase shift angle between the two AC networks, involve no significant short-circuit contribution from one AC network to the other, remain robust during contingencies, and generate no harmonics.

According to the present invention, there is provided a method of interconnecting first and second synchronous polyphase AC networks having respective phase lines for regulating transfer of active power from one of the AC networks to the other of the AC networks. The method comprises the steps of, for each phase line of the first AC network: providing a first reactive element and a second reactive element, each reactive element having a first end and a second end; connecting the first end of the first reactive element to the phase line of the first AC network; connecting the first end of the second reactive element to the phase line of the first AC network; applying to the second end of the first reactive element a first phase voltage derived from the second AC network; and applying to the second end of the second reactive element a second phase voltage derived from the second AC network, the second phase voltage being phase shifted with respect to the first phase voltage, one of the reactive elements being inductive and the other of the reactive elements being capacitive. In operation, a phase shift between the first and the second phase voltages forces a transfer of active power from one of the AC networks to the other.

According to the present invention, an interconnecting apparatus for interconnecting first and second synchronous polyphase AC networks and for regulating transfer of active power from one of the AC networks to the other of the AC networks. Each of the networks has a plurality of phase lines. The interconnecting apparatus includes, for each phase line of the first AC network, a first reactive element and a second reactive element. The first and second reactive elements each have a first end and a second end. The first end of the first reactive element is provided with first connecting means for connecting the first reactive element to the phase line of the first AC network. The first end of the second reactive element is provided with a second connecting means for connecting the second reactive element to the phase line of the first AC network. The apparatus also includes a first connecting and transformer means for applying to the second end of the first reactive element a first phase voltage derived from the second AC network. The apparatus further includes a second connecting and transformer means for applying to the second end of the second reactive element a second phase voltage derived from the second AC network. The second phase voltage is phase shifted with respect to the first phase voltage. One of the reactive elements is inductive and the other of the reactive elements is capacitive. In operation, a phase shift between the first and second phase voltages forces a transfer of active power from one of the AC networks to the other.

BRIEF DESCRIPTION OF THE DRAWINGS

In order to impart full understanding of the manner in which these and other objectives are attained in accordance to the present invention, preferred embodiments thereof are described hereinafter with reference to the accompanying drawings wherein:

FIG. 18 is a table illustrating operating points available from the interconnecting apparatus shown in FIG. 8 at normal conditions;

FIGS. 19 to 23 are diagrams illustrating sensitivity of powers and voltages to short-circuit level variations on S side of the interconnecting apparatus shown in FIG. 8;

FIG. 26 is a table illustrating operating points available from the interconnecting apparatus shown in FIGS. 2 and 25;

FIG. 34 is a table illustrating steady-state voltages and currents rating for different phase shifts between voltages on S and R sides of the interconnecting apparatus shown in FIGS. 2 and 25;

FIG. 38 is a top view layout of the interconnecting apparatus shown in FIGS. 35a and 36a;

DETAILED DESCRIPTION OF THE PREFERRED EMBODIMENTS

Figure 1:
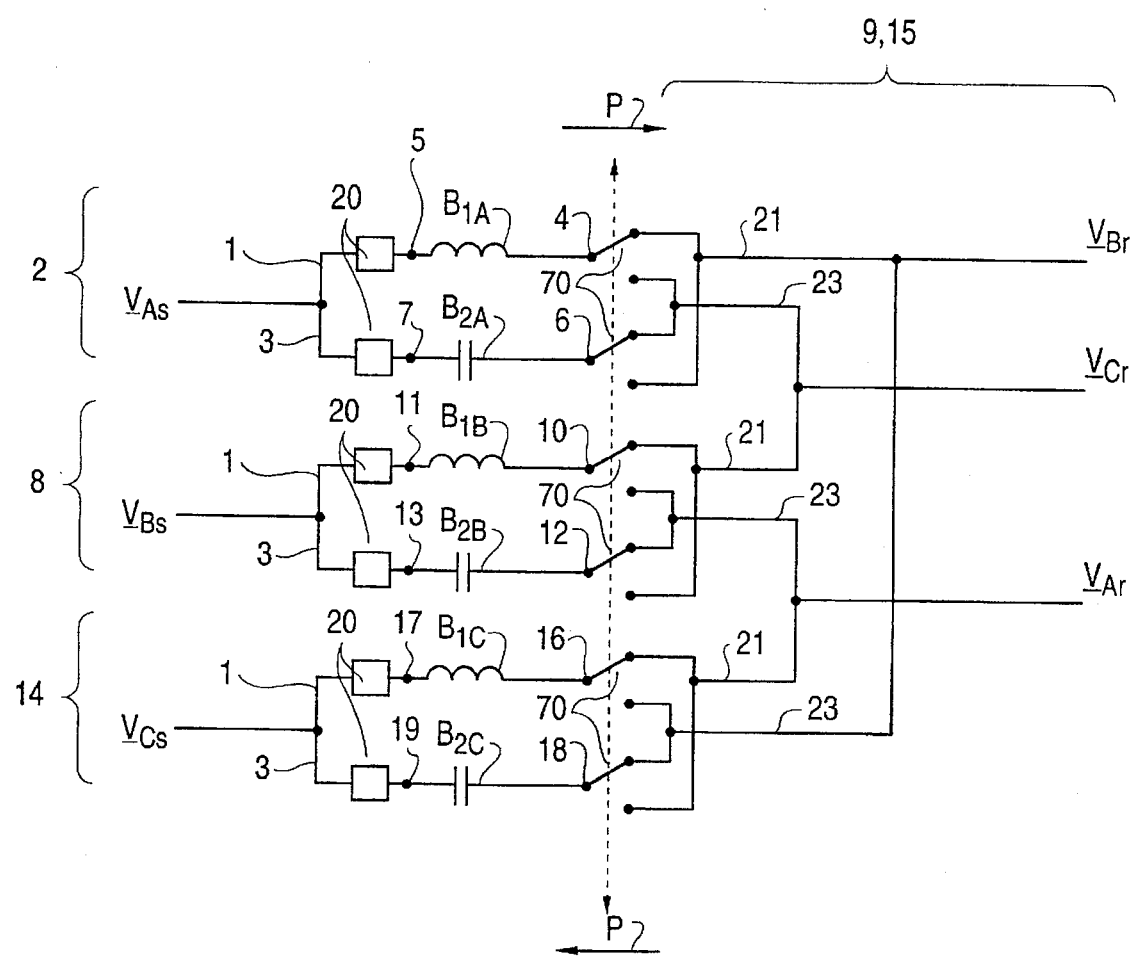
FIGS. 1 to 4 are electrical circuit diagrams illustrating four interconnecting apparatus according to the present invention.

In the following description and in the drawings, the same numerals will refer to the same or similar elements.

Referring to FIGS. 1 to 4, there are shown interconnecting apparatus for interconnecting first and second synchronous polyphase AC networks, for regulating transfer of active power from one of the AC networks (acting as a "sending" network) to the other AC network (acting as a "receiving" network), each network having a plurality of phase lines providing line voltages $\underline{V}_{As}$, $\underline{V}_{Bs}$, $\underline{V}_{Cs}$ (for the "sending" network), and $\underline{V}_{Ar}$, $\underline{V}_{Br}$, $\underline{V}_{Cr}$ (for the "receiving" network).

The apparatus comprises, for each phase line of the first AC network, a first reactive element $B_{1A}$, $B_{1B}$, $B_{1C}$ having a first end 5, 11, 17 provided with a first connector 1 for connecting the first reactive element $B_{1A}$, $B_{1B}$, $B_{1C}$ to the phase line of the first AC network (the "s" side). The first reactive element $B_{1A}$, $B_{1B}$, $B_{1C}$ has also a second end 4, 10, 16. The apparatus further comprises, for each phase line of the first AC network, a second reactive element $B_{2A}$, $B_{2B}$, $B_{2C}$ having a first end 7, 13, 19 provided with a second connector 3 for connecting the second reactive element $B_{2A}$, $B_{2B}$, $B_{2C}$ to the phase line of the first AC network (the "s" side). The second reactive element $B_{2A}$, $B_{2B}$, $B_{2C}$ has also a second end 6, 12, 18. Thus, the reactive element $B_{1A}$, $B_{1B}$, $B_{1C}$ and $B_{2A}$, $B_{2B}$, $B_{2C}$ are subjected to the line voltages $\underline{V}_{As}$, $\underline{V}_{Bs}$, $\underline{V}_{Cs}$.

A first connecting and transformer device 9 is provided for applying to the second end 4, 10, 16 of the first reactive element $B_{1A}$, $B_{1B}$, $B_{1C}$ a first phase voltage derived from the second AC network (i.e. the line voltages $\underline{V}_{Ar}$, $\underline{V}_{Br}$, $\underline{V}_{Cr}$ of the "r" side). A second connecting and transformer device 15 is provided for applying to the second end 6, 12, 18 of the second reactive element $B_{2A}$, $B_{2B}$, $B_{2C}$ a second phase voltage derived from the second AC network (i.e. the line voltages $\underline{V}_{Ar}$, $\underline{V}_{Br}$, $\underline{V}_{Cr}$ of the "r" side). The second phase voltage must however be phase shifted with respect to the first phase voltage. The reactive element $B_{1A}$, $B_{1B}$ and $B_{1C}$ are inductive and the other reactive element $B_{2A}$, $B_{2B}$ and $B_{2C}$ are capacitive. In operation, a phase shift between the first and the second phase voltages forces a regulated transfer of active power from one of the AC networks (the "s" side) to the other (the "r" side).

Preferably, the capacitors $B_{2A}$, $B_{2B}$, $B_{2C}$ and inductors $B_{1A}$, $B_{1B}$, $B_{1C}$ are connected in series with switches 20 for selecting their use so as to provide various modes of regulation of the power transfer conditions between the first and the second AC networks.

According to the invention, the method of interconnecting the first and second polyphase AC networks comprises the following steps for each phase line of the first AC network: connecting the first end 5, 11, 17 of the first reactive element $B_{1A}$, $B_{1B}$, $B_{1C}$ to the phase line of the first AC network (providing the line voltages $V_{As}$, $V_{Bs}$, $V_{Cs}$); connecting the first end 7, 13, 19 of the second reactive element $B_{2A}$, $B_{2B}$, $B_{2C}$ to the phase line of the first AC network; applying to the second end 4, 10, 16 of the first reactive element $B_{1A}$, $B_{1B}$, $B_{1C}$ a first phase voltage derived from the second AC network (providing the line voltages $V_{Ar}$, $V_{Br}$, $V_{Cr}$); and applying to the second end 6, 12, 18 of the second reactive element $B_{2A}$, $B_{2B}$, $B_{2C}$ a second phase voltage derived from the second AC network. This second phase voltage is shifted with respect to the first phase voltage. One of the reactive elements, for example $B_{1A}$, $B_{1B}$, $B_{1C}$, is inductive, and the other reactive element, in this example $B_{2A}$, $B_{2B}$, $B_{2C}$, is capacitive. In operation, the phase shift between the first and the second phase voltages forces a transfer of active power from one of the AC networks to the other.

Referring now to FIG. 1, the interconnecting apparatus is arranged to interconnect two three-phase AC networks each having three phase lines providing line voltages $V_{As}$, $V_{Bs}$, $V_{Cs}$ and $V_{Ar}$, $V_{Br}$, $V_{Cr}$. The characteristic of this arrangement is that each first phase voltage as defined hereinabove has substantially a 240° phase shift with respect to the corresponding second phase voltage as defined hereinabove. This characteristic is obtained, for each inductive element $B_{1A}$, $B_{1B}$, $B_{1C}$, by directly connecting through a short circuit 21 its second end 4, 10, 16 to a first phase line of the second AC network, and for each corresponding capacitive element $B_{2A}$, $B_{2B}$, $B_{2C}$, by directly connecting through a short circuit 23 its second end 6, 12, 18 to a second phase line of the second AC network, which has a 240° phase shift with respect to the first phase line of the second AC network. In that case, the first and second connecting and transformer devices 9, 15 are therefore formed by the short circuits 21, 23. Every first and second phase voltages are +120° and −120° phase shifted (for a 240° interphase total) with respect to the corresponding line voltage $V_{As}$, $V_{Bs}$, $V_{Cs}$ of the first AC network.

Figure 3:
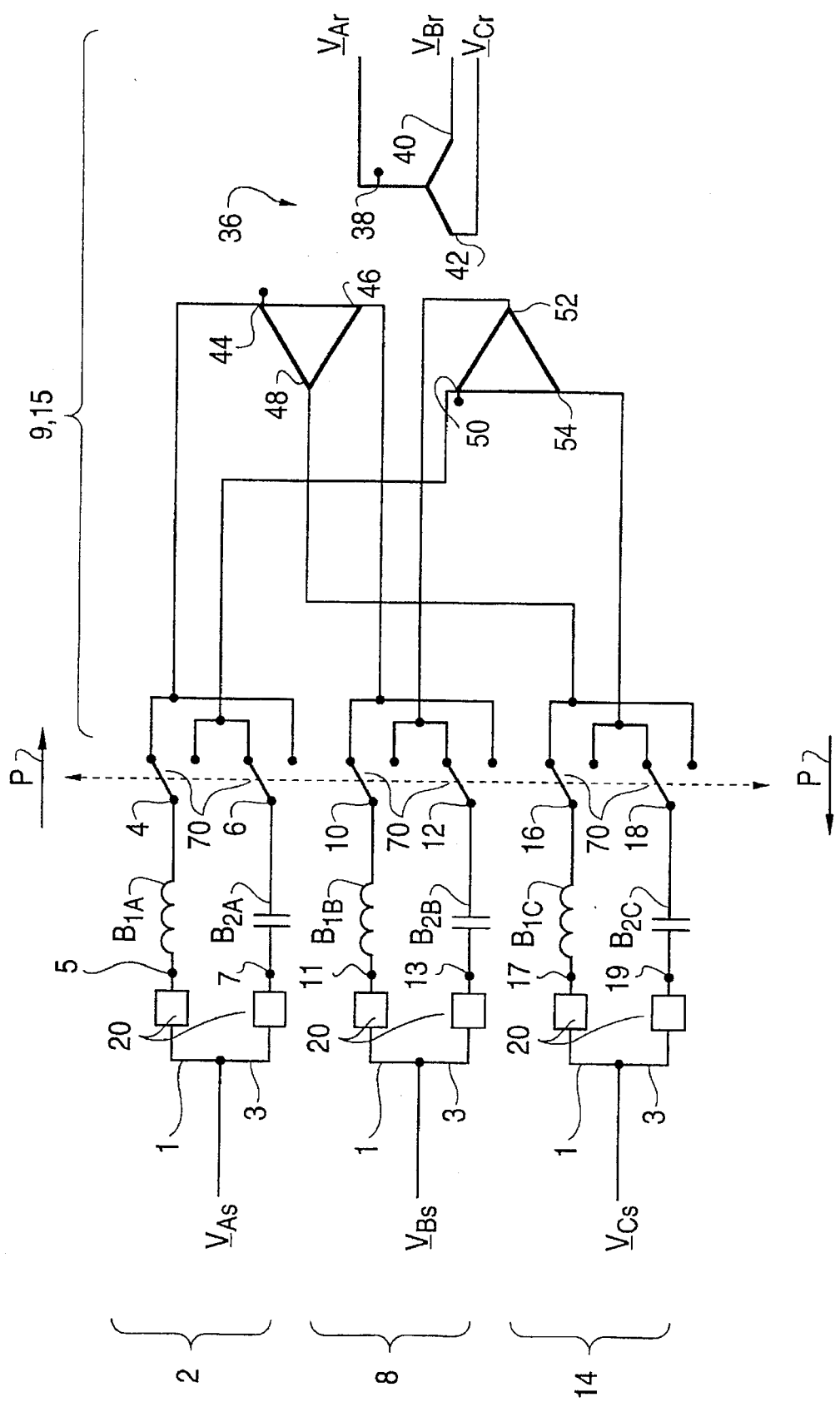

Referring now to FIG. 3, the difference with the interconnecting apparatus shown in FIG. 1 resides in that each first phase voltage has a 60° phase shift with respect to the corresponding second phase voltage. This characteristic is obtained, for each inductive element $B_{1A}$, $B_{1B}$, $B_{1C}$, by connecting its second end 4, 10, 16 to a phase terminal 44, 46, 48 of first Δ-connected secondary windings of a three-phase transformer 36 having Y-connected primary windings provided with line terminals 38, 40, 42 for connection with the second AC network, and for each capacitive element $B_{2A}$, $B_{2B}$, $B_{2C}$, by connecting its second end 6, 12, 18 to a phase terminal 50, 52, 54 of second Δ-connected secondary windings of the three-phase transformer 36. In that case, the first and second connecting and transformer devices 9, 15 are therefore formed by the three-phase transformer 36. Every first and second phase voltages are +30° and −30° phase shifted with respect to the corresponding line voltage $V_{As}$, $V_{Bs}$, $V_{Cs}$ of the first AC network.

Figure 2:
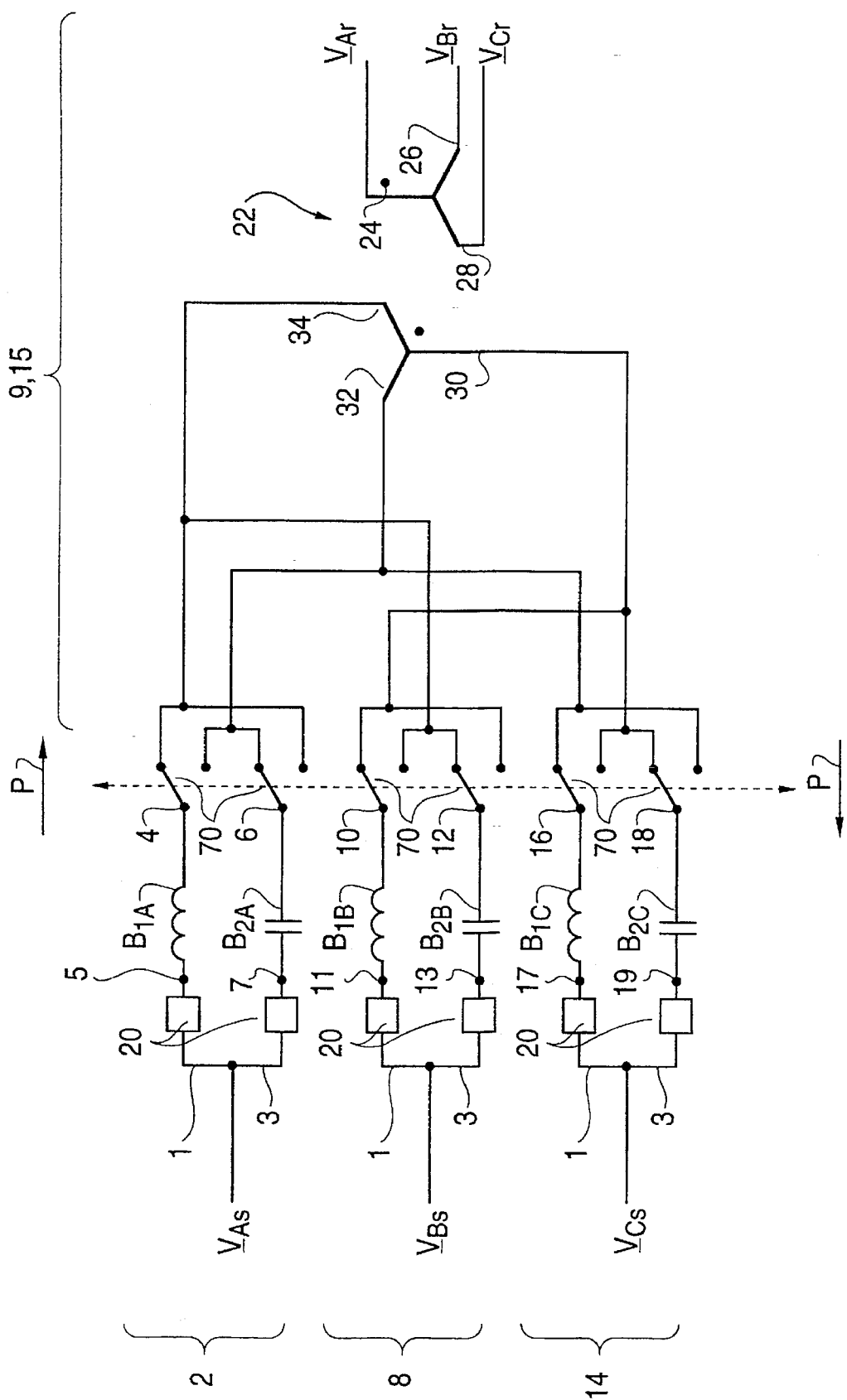

Referring now to FIG. 2, each first phase voltage has a 120° phase shift with respect to the corresponding second phase voltage. This characteristic is obtained, for each inductive element $B_{1A}$, $B_{1B}$, $B_{1C}$, by connecting its second end 4, 10, 16 to a phase terminal 30, 32, 34 of Y-connected secondary windings of a three-phase transformer 22 having Y-connected primary windings provided with line terminals 24, 26, 28 for connection with the second AC network, and for each capacitive elements $B_{2A}$, $B_{2B}$, $B_{2C}$, by connecting its second end 6, 12, 18 to another phase terminal 30, 32, 34 of the Y-connected secondary windings of the three-phase transformer 22. In that case, the first and second connecting and transformer devices 9, 15 are therefore formed by the three-phase transformer 22. Every first and second phase voltages are +60° and −60° phase shifted with respect to the corresponding line voltage $V_{As}$, $V_{Bs}$, $V_{Cs}$ of the first AC network.

Figure 4:
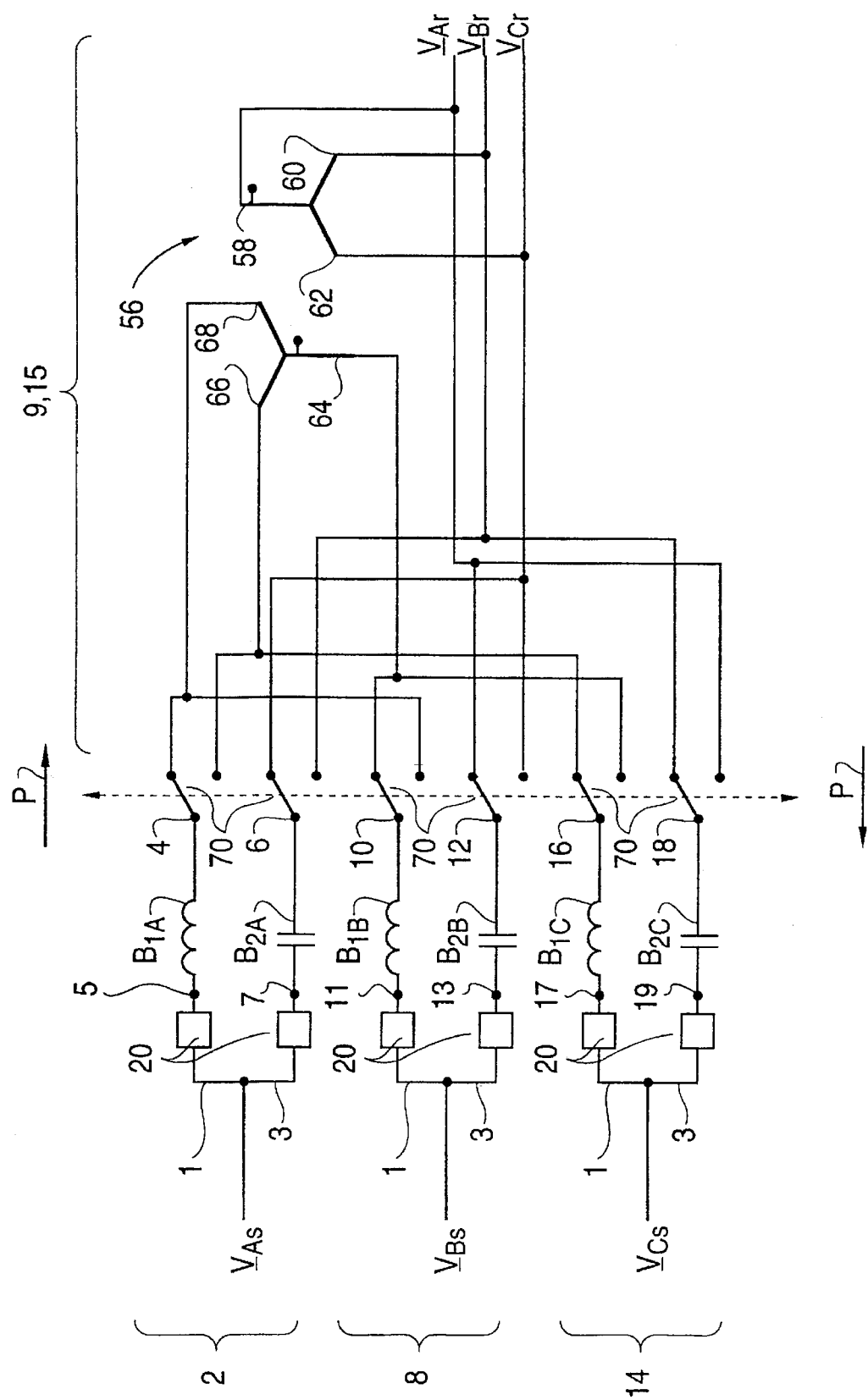

Referring now to FIG. 4, each first phase voltage has a 180° phase shift with respect to the corresponding second phase voltage. This characteristic is obtained, for each inductive element $B_{1A}$, $B_{1B}$, $B_{1C}$, by connecting its second end 4, 10, 16 to a phase terminal 64, 66, 68 of Y-connected secondary windings of a three-phase transformer 56 having Y-connected primary windings provided with line terminals 58, 60, 62 for connection with the second AC network, and for each capacitive element $B_{2A}$, $B_{2B}$, $B_{2C}$, by directly connecting through a short circuit 25 its second end 6, 12, 18 to a phase line of the second AC network. In that case, the first connecting and transformer device 9 is formed by the three-phase transformer 56 whereas the second connecting and transformer device 15 is formed by the short circuits 25. Every first and second phase voltages are +60° and −120° phase shifted with respect to the corresponding line voltage $V_{As}$, $V_{Bs}$, $V_{Cs}$ of the first AC network. The 180° characteristic is therefore off centered.

Figure 41:
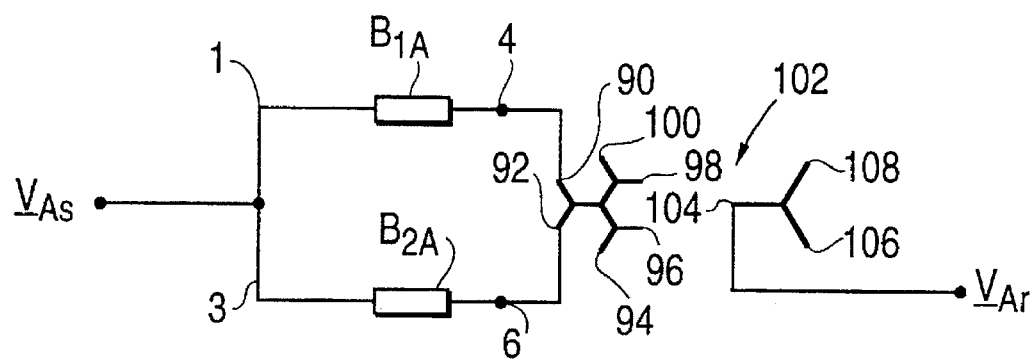

Referring now to FIG. 41, there is shown a partial arrangement of a variant of the interconnecting apparatus of FIG. 3. In this case, the second end 4 of the inductive element $B_{1A}$ is connected to a first phase terminal 90 of six-phase zigzag-connected secondary windings of a transformer 102 having three-phase Y-connected primary windings provided with line terminals 104, 106, 108 for connection with the second AC network. The second end 6 of the capacitive element $B_{2A}$ is connected to a second phase terminal 92 of the six-phase zigzag-connected secondary windings. All of the first and second connecting and transformer devices are formed by the transformer 102. It must be understood that such an arrangement may be provided for each of the phase lines of the first AC network.

Figure 42:
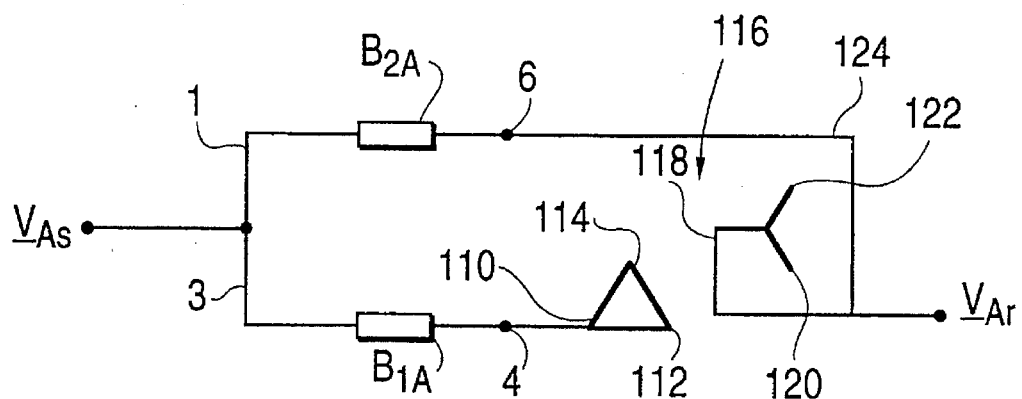

Referring now to FIG. 42, there is shown a partial arrangement of an interconnecting apparatus in which the first phase voltage has a 30° phase shift with respect to the corresponding second phase voltage. This characteristic is obtained by connecting the second end 4 of the reactive element $B_{1A}$ to a phase terminal 110 of Δ-connected secondary windings of a three-phase transformer 116 having Y-connected primary windings provided with line terminals 118, 120, 122 for connection with the second AC network, and by directly connecting through a short circuit 124 the second end 6 of the reactive element $B_{2A}$ to a phase line of the second AC network (as the one providing the line voltage $V_{Ar}$). It must be understood that such an arrangement may be provided for each of the phase lines of the first AC network. In this case, all of the first connecting and transformer devices are formed by the transformer 116 whereas each second connecting and transformer devices is formed by the short circuit 124. Every first and second phase voltages are −30° and 0° phase shifted with respect to the corresponding line voltage $V_{As}$, $V_{Bs}$, $V_{Cs}$ of the first AC network. The 30° characteristic is therefore off centered.

Figure 43:
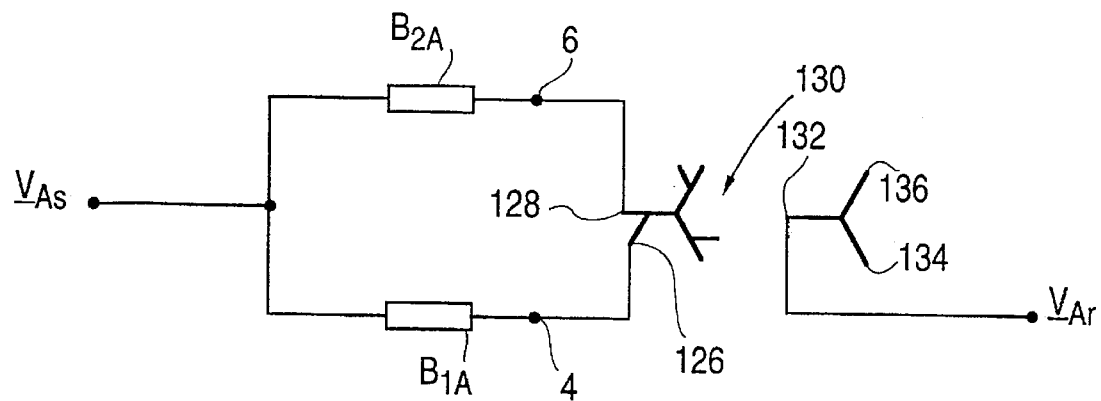

Referring to FIG. 43, there is shown another partial arrangement of an interconnecting apparatus in which the first phase voltage has a 30° phase shift with respect to the corresponding second phase voltage. This characteristic is obtained by connecting the second end 4 of the reactive element $B_{1A}$ to a first phase terminal 126 of Y and zigzag-connected secondary windings of a three-phase transformer 130 having Y-connected primary windings provided with line terminals 132, 134, 136 for connection with the second AC network, and by connecting the second end of the second reactive element $B_{2A}$ to a second phase terminal 128 of the Y and zigzag-connected secondary windings. The second phase terminal 128 should be different from the first phase terminal 126 so that the first and second phase voltages are phase shifted while they have substantially similar amplitudes. The first phase terminal 126 is formed by connecting to a tap terminal of the concerned secondary winding (ended by the phase terminal 128) a winding leg of another winding of the transformer 130. It must be understood that such an arrangement may be provided for each of the phase lines of the first AC network. In that case, all of the first and second connecting and transformer devices are formed by the transformer 130. Every first and second phase voltages are $-30°$ and $0°$ phase shifted with respect to the corresponding line voltage $\underline{V}_{As}$, $\underline{V}_{Bs}$, $\underline{V}_{Cs}$ of the first AC network. The $30°$ characteristic is therefore off centered. Such an arrangement is particularly well suited to interconnect two AC networks operating at different voltage levels (such as 315 kV and 120 kV networks). This voltage change is carried out by the transformer 130 which is further used in combination with the reactive elements $B_{1A}$, $B_{2A}$ to regulate transfer of active power between the two AC networks. The transformer 130 thus modifies amplitudes of the first and second phase voltages with respect to amplitudes of the line voltages provided by the second AC network.

Figure 44:
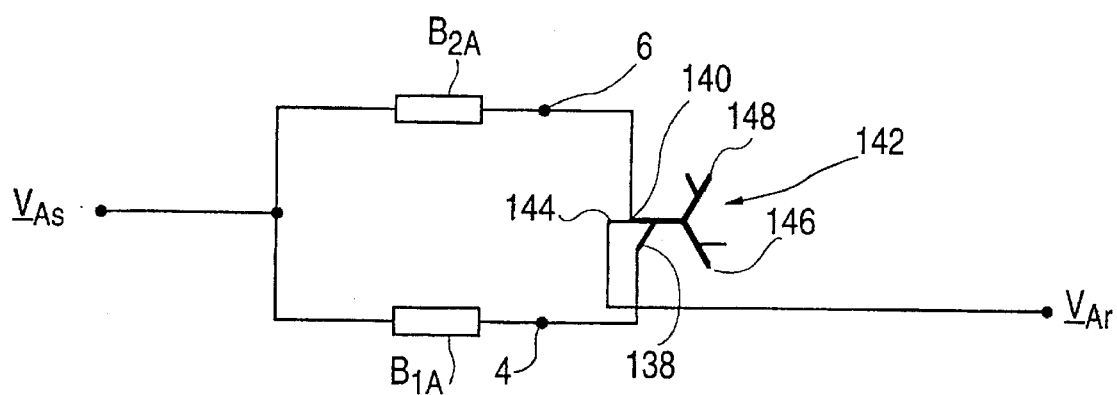

Referring now to FIG. 44, there is shown a partial arrangement of an interconnecting apparatus which is equivalent to the arrangement shown in FIG. 43, but that uses a three-phase autotransformer 142 instead of a three-phase transformer (130). The second end 4 of the first reactive element $B_{1A}$ is connected to a tap connection 138 of a first phase terminal 139 of the Y and zigzag-connected three-phase autotransformer 142 provided with line terminals 144, 146, 148 for connection with the second AC network. The second end 6 of the second reactive element $B_{2A}$ is connected to a second phase terminal 140 of the Y and zigzag-connected autotransformer 142. The second phase terminal 140 should be different from the first phase terminal 139 (formed as described for FIG. 43) so that the first and second phase voltages are phase shifted while they have substantially similar amplitudes. It must be understood that such an arrangement may be provided for each of the phase lines of the first AC network. In this case, all of the first and second connecting and transformer devices are formed by the autotransformer 142. Every first and second phase voltages are $-30°$ and $0°$ phase shifted with respect to the corresponding line voltage $\underline{V}_{As}$, $\underline{V}_{Bs}$, $\underline{V}_{Cs}$ of the first AC network. The $30°$ characteristic is therefore off centered.

Figures 37, 45:
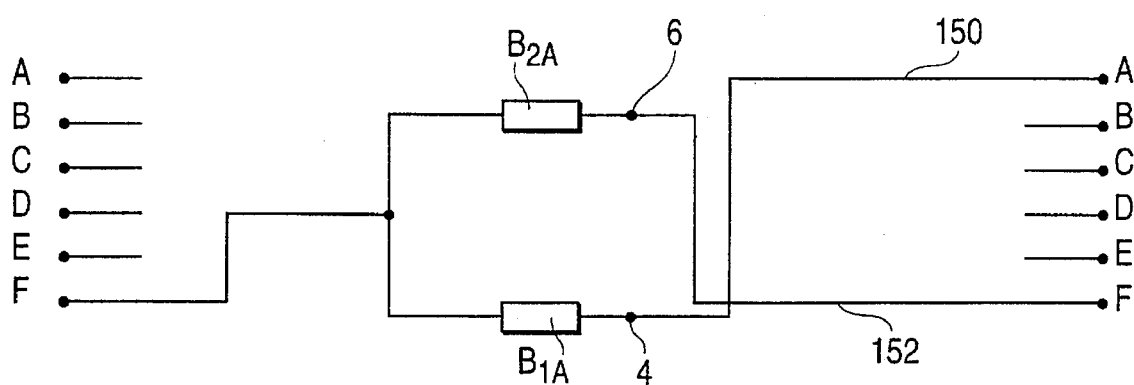
FIG. 37 is a table illustrating maximum stress characteristics for the interconnecting apparatus shown in FIGS. 35a and 36a, during a three-phase opening.
FIGS. 41 to 45 are electrical circuit diagrams illustrating parts of five interconnecting apparatus according to the present invention.

Referring now to FIG. 45, there is shown a partial arrangement of an interconnecting apparatus for interconnecting two six-phase AC networks each having six phase lines A, B, C, D, E, F, G. The characteristic of this arrangement is that each first phase voltage has substantially a $60°$ phase shift with respect to the corresponding second phase voltage. This characteristic is obtained by directly connecting through a short circuit 150 the second end 4 of the first reactive element $B_{1A}$ to a first phase line (F) of the second AC network, and by directly connecting through a short circuit 152 the second end 6 of the second reactive element $B_{2A}$ to a second phase line (A) of the second AC network. The second phase line (A) should be different from the first phase line (F) so that the first phase voltage has a $60°$ phase shift with respect to the second phase voltage. It must be understood that such an arrangement may be provided for each of the phase lines of the first AC network. Furthermore, such an arrangement may be used as well to interconnect a three-phase AC network with a six-phase AC network. Every first and second connecting and transformer devices are therefore formed by the short circuits 150, 152. Every first and second phase voltages are $-60°$ and $0°$ phase shifted with respect to the corresponding line voltage provided on the phase line (A) of the first AC network. The $60°$ characteristic is therefore off centered.

The reasons explaining the use of the various abovementioned embodiments of the interconnecting apparatus will become more apparent hereinafter.

Referring to FIGS. 1 to 3, the interconnecting apparatus may preferably further comprises power reversal switches 70 for inverting, in each of interconnection circuits 2, 8, 14, positions of the corresponding reactive elements $B_{1A}$ and $B_{2A}$, $B_{1B}$ and $B_{2B}$, $B_{1C}$ and $B_{2C}$ with one another (or switching the phase voltage formerly applied to the second end 4, 10, 16 of the corresponding first reactive element $B_{1A}$, $B_{1B}$, $B_{1C}$ to the second end 6, 12, 18 of the corresponding second reactive element $B_{2A}$, $B_{2B}$, $B_{2C}$ and vice versa) so as to enable the apparatus to invert the direction of the power flow between the two AC networks.

Referring to FIG. 4, the apparatus in this case may preferably further comprises power reversal switches 70 for reconnecting: in the first interconnection circuit 2, the first reactive element's end 4 from the phase terminal 68 to the phase terminal 66, and the second reactive element's end 6 from the phase terminal 62 to the phase terminal 60; in the second interconnection circuit 8, the first reactive element's end 10 from the phase terminal 64 to the phase terminal 68, and the second reactive element's end 12 from the phase terminal 58 to the phase terminal 62; and in the third interconnection circuit 14, the first reactive element's end 16 from the phase terminal 66 to the phase terminal 64, and the second reactive element's end 18 from the phase terminal 60 to the phase terminal 58.

Other arrangements of power reversal switches may also be similarly provided for the interconnecting circuits shown in FIGS. 41–45.

Referring again to FIGS. 1 to 4, the power reversal switches 70 may conveniently be sectionalizers, circuit breakers or thyristor valves, although other types of suitable switch could be used as well. The switches 20 that are in series with the capacitors $B_{2A}$, $B_{2B}$, $B_{2C}$ and the inductors $B_{1A}$, $B_{1B}$, $B_{1C}$ may conveniently be circuit breakers or thyristor valves, although other types of suitable switch can be used as well. These switches 20 are used to disconnect any one of the reactive elements in operation, if desired.

The following discussion relates to a specific but non restrictive application of the interconnecting apparatus (hereinafter also referred to as IPC) which is based on the series connection of impedances between different phases of the two (synchronous) AC networks to be interconnected. The IPC acts as a current source with the following characteristics:

the power flow is nearly constant (within about 10%) for a wide range (about ±25°) of angle between the two AC networks;

there is no significant short-circuit contribution from one AC network to the other;

severe contingencies on one side of the apparatus have negligible impact on the voltage of the other side; and no harmonics are generated (because the control is achieved in a passive fashion).

Other operating conditions (reduced power, reactive power generation or absorption) are possible by switching the impedance components.

The IPC ensures reliable and predictable operation under normal as well as contingency conditions. In addition, the IPC can provide reactive power support for the adjustment of the voltages in the case of contingencies.

Figure 5:
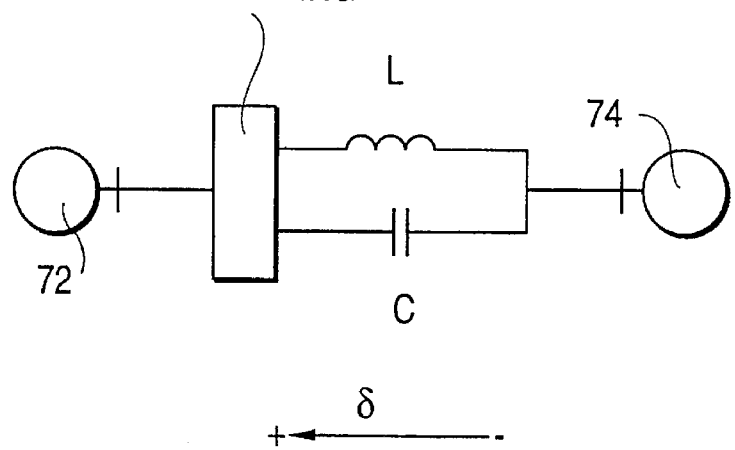
FIG. 5 is a schematic diagram illustrating the operating principle of an interconnecting apparatus according to the present invention.

Referring to FIG. 5, the IPC uses a group of three-phase reactors (inductors) L and capacitors C each installed in series between two AC networks or subnetworks 72, 74. What distinguishes this new class of equipment from other series compensation equipment is the way in which the series components are connected to the networks. For instance, the phase A reactor and capacitor of the first network could be connected to phases B and C of the second network. Thus, whatever the angle δ of the voltage phase shift at the IPC terminals, some of the components are always subjected to a certain voltage. By adjusting the value of these components, it is always possible to force a current in each of the AC networks even if the angle δ at the terminals is nil. When all components are energized, the amplitude and phase angle of the current are set in one of the two buses to which the IPC is connected. This current control thus enables the power carried by the IPC to be set, as well as the reactive power absorbed or generated at one of the buses.

In the following description, the reactors (inductors) L and capacitors C are considered to be ideal without any losses. The impedances and the admittances of these series components are then respectively reduced to their imaginary part, i.e. reactance and susceptance.

Figure 6:
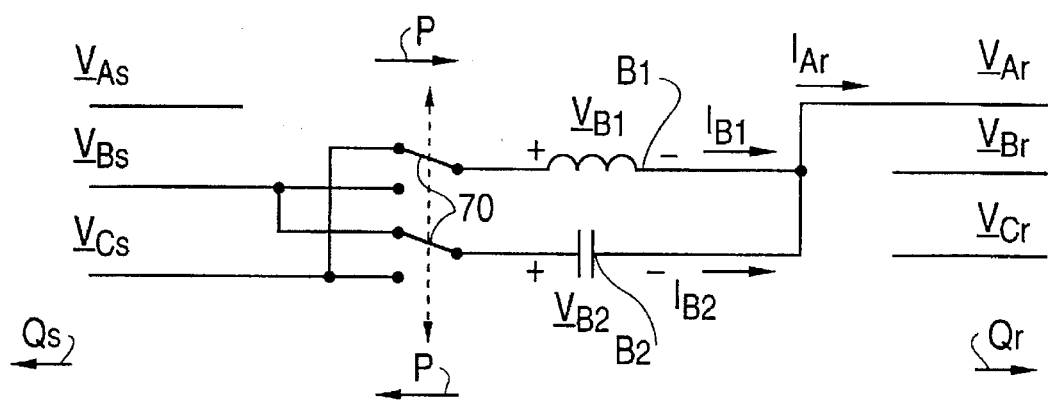
FIG. 6 is an electrical circuit diagram illustrating currents and voltages in the interconnecting apparatus shown in FIG. 1.
Figure 7:
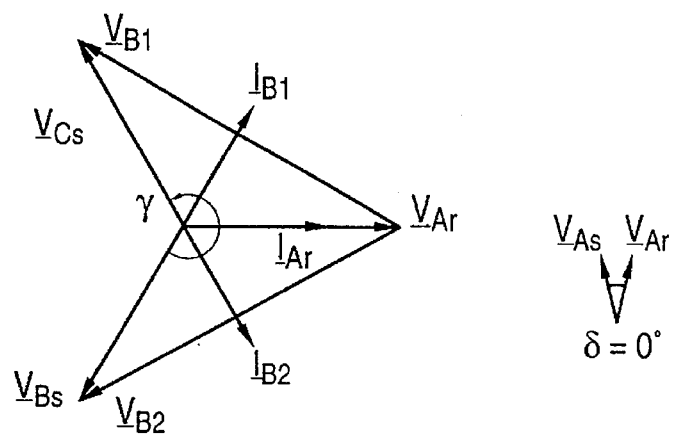
FIG. 7 is a phase diagram of the voltages and currents illustrated in FIG. 6.

Referring to FIGS. 6 and 7, the direction of the active power flow P (depicted by arrows) can be inverted by means of the power reversal switches 70. The active power P is defined as positive when the flow occurs from the "s" (sending) side towards the "r" (receiving) side of the IPC. Reactive powers depicted by arrows $Q_s$ and $Q_r$ are positive when the IPC generates reactive power to the buses (not shown in the Figures) to which it is connected.

Where the flow is positive, reactive elements $B_1$ and $B_2$ are connected to voltage points $\underline{V}_{Cs}$ and $\underline{V}_{Bs}$ respectively. Power flow inversion is simply done by reconnecting the reactive elements on the "s" side so that $B_1$ takes the position of $B_2$ and vice versa.

The IPC is designated as 240 type since the reactive elements $B_1$ and $B_2$ are respectively connected to voltage points $\underline{V}_{Cs}$ and $\underline{V}_{Bs}$, which are phase shifted by an angle γ of 240°.

The phase current $\underline{I}_{Ar}$ is equal to the sum of the currents $\underline{I}_{B1}$ and $\underline{I}_{B2}$ in the reactive elements $B_1$, $B_2$. Since these currents $\underline{I}_{B1}$ and $\underline{I}_{B2}$ have angles of +60° and –60° with respect to the voltage $\underline{V}_{Ar}$, their power factor is low.

Figure 8:
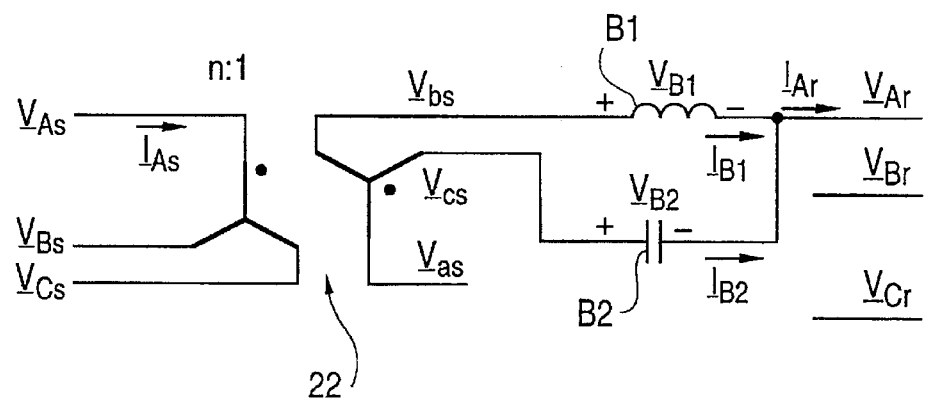
FIG. 8 is an electrical circuit diagram illustrating current and voltages in the interconnecting apparatus shown in FIG. 2.
Figure 9:
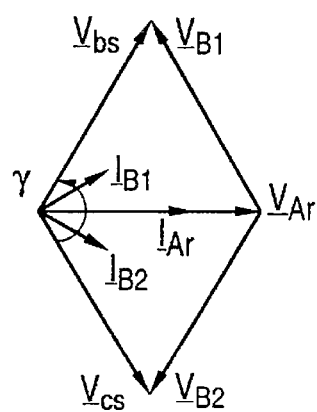
FIG. 9 is a phase diagram of the voltages and currents illustrated in FIG. 8.

Referring to FIGS. 8 and 9, to improve the power factor of the currents, a Y-y6 transformer 22 can be used.

Reactive elements $B_1$ and $B_2$ are now connected on the "s" side to the $\underline{V}_{Bs}$ and $\underline{V}_{Cs}$ voltages, respectively. Since these voltages form an angle γ of 120° with respect to each other, the IPC is designated as 120 type. Various connections of the secondary of the transformer 22 producing an angular rotation of phases on the transformer side can give a wider range of operation of the IPC for a complete 360° angular range.

Voltages $\underline{V}_{B1}$ and $\underline{V}_{B2}$ applied to reactive elements $B_1$ and $B_2$ generate currents $\underline{I}_{B1}$ and $\underline{I}_{B2}$, respectively, that form an angle of 60° between them. The current $\underline{I}_{Ar}$ of phase A on the "r" side is directly equal to the sum of these currents. Since the IPC is symmetrical, the current $\underline{I}_{As}$ is equal, with respect to transformation ratio n, to the sum of currents $\underline{I}_{B1}$ and $\underline{I}_{B2}$, phase shifted by –60° and +60°, respectively. By adjusting the susceptances of the reactive elements $B_1$, $B_2$, the IPC thus provides full control over the amplitude and phase angle of current $\underline{V}_{As}$ with respect to the voltage $\underline{V}_{As}$ or, similarly, full control of $\underline{I}_{Ar}$ with respect to the voltage $\underline{V}_{Ar}$. It is thus possible to set power $S_s$ or $S_r$, which are defined as pointing towards the "s" and "r" sides, respectively (towards the outer side of the IPC):

$$\underline{S}_s = -\underline{V}_s \underline{I}_s^* = -P + jQ_s \tag{A.1}$$

$$\underline{S}_r = -\underline{V}_r \underline{I}_r^* = P + jQ_r \tag{A.2}$$

The active power P is positive when the power flow occurs from "s" to "r". Active powers $Q_s$ and $Q_r$ are positive when the IPC generates reactive power to the buses to which it is connected.

Where the transformer is ideal and n=1, the values for P, $Q_s$ and $Q_r$ are given by:

$$\begin{bmatrix} -V_s V_r \sin\delta_{B1} & -V_s V_r \sin\delta_{B2} \\ V_s^2 - V_s V_r \cos\delta_{B1} & V_s^2 - V_s V_r \cos\delta_{B2} \\ V_r^2 - V_s V_r \cos\delta_{B1} & V_r^2 - V_s V_r \cos\delta_{B2} \end{bmatrix} \begin{bmatrix} B_1 \\ B_2 \end{bmatrix} = \begin{bmatrix} P \\ Q_s \\ Q_r \end{bmatrix} \tag{A.3}$$

Angles $\delta_{B1}$ and $\delta_{B2}$ are the phase shifts appearing between the voltages on the "s" and "r" sides of reactive elements $B_1$ and $B_2$, respectively. Thus:

$$\delta_{B1} = \delta - \psi_1 \tag{A.4}$$

$$\delta_{B2} = \delta - \psi_2 \tag{A.5}$$

The angle δ represents the phase shift between voltages $\underline{V}_{As}$ and $\underline{V}_{Ar}$. The angular displacements ψ1 and ψ2 of the 120 type IPC are –60° and 60° respectively.

Equation (A.3) is a system of 3 equations with two unknown quantities. The 120 type IPC may therefore control any of the three powers P, $Q_s$, $Q_r$ provided that the two susceptances of the reactive elements $B_1$, $B_2$ can be varied. Using a regulating system, it is possible to convert the control of $Q_s$ or $Q_r$ into a regulation of $V_s$ or $V_r$. Other regulation strategies may also be devised. Moreover, with a third reactive element, three variables can be controlled.

Where the P and $Q_r$ values are controlled, the susceptances of the reactive elements are given by:

$$B_1 = \frac{-P(2V_r + V_s\cos\delta - \sqrt{3}\ V_s\sin\delta) + Q_r V_s(\sqrt{3}\ \cos\delta + \sin\delta)}{\sqrt{3}\ V_s V_r (V_s + 2V_r\cos\delta)} \tag{A.6}$$

$$B_2 = \frac{P(2V_r + V_s\cos\delta + \sqrt{3}\ V_s\sin\delta) + Q_r V_s(\sqrt{3}\ \cos\delta - \sin\delta)}{\sqrt{3}\ V_s V_r (V_s + 2V_r\cos\delta)} \tag{A.7}$$

The following equation deducted from (A.3) shows that $Q_s = Q_r$, whatever $V_s$ and $V_r$, when the susceptances of the reactive elements are conjugated:

$$Q_s = (B_1 + B_2)(V_s^2 - V_r^2) + Q_r \tag{A.8}$$

For the same power level (i.e. the same current $\underline{I}_{Ar}$ in FIGS. 6 and 8), the currents in the reactive elements are now much smaller. The phase shifts of currents $\underline{I}_{B1}$ and $\underline{I}_{B2}$ with respect to the voltage $\underline{V}_{Ar}$ is +30° and –30° respectively, which results in a better power factor.

The installed reactive power is significantly lower than that of the 240 type IPC, which compensates for the additional transformer 22. The total losses are about the same in both cases.

If susceptances of the reactive elements $B_1$ and $B_2$ are variable, the IPC can directly control the active power P and reactive power $Q_s$ or $Q_r$ as long as there are voltages applied on the reactive elements $B_1$ and $B_2$. With a regulating system, it is also possible to control other variables such as the voltages $V_{As}$ or $V_{Ar}$ at the IPC terminals.

In the case of an application where only the active power flow has to be controlled over a limited angle range centered about $\delta=0°$, the susceptances of the reactive elements $B_1$ and $B_2$ can be set to fixed values.

Figure 10:
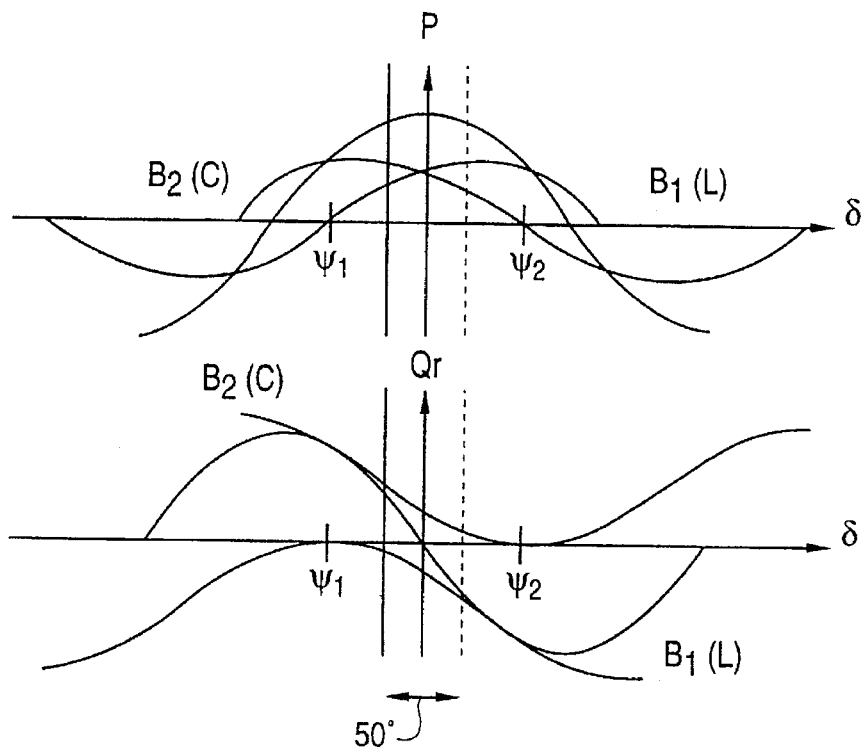
FIG. 10 is a diagram illustrating idealized active and reactive power characteristics (on R-side) of the interconnecting apparatus shown in FIG. 8.

FIG. 10 shows the idealized characteristics of the active and reactive power P, $Q_r$ on the "r" side of the $B_1$ and $B_2$ susceptances reactive elements shown in FIG. 8, as a function of the angle $\delta$ when the 120 type IPC is connected to two infinite buses. The characteristics of reactive elements $B_1$ and $B_2$ are shifted by the angles $\psi_1=-60°$ and $\psi_2=+60°$, respectively. The transformer is considered to be ideal. The characteristics of the active power P and reactive power $Q_r$ result from adding the characteristics of each of the reactive elements $B_1$ and $B_2$. Operation at unity power factor of the IPC with $\delta=0°$ is obtained by assuming that $B_1=-B_2$ (the susceptances of the reactive elements are conjugated). The power flow P is then a function of the $\cos(\delta)$, while the reactive power $Q_r$ varies according to $-\sin(\delta)$.

The $Q_s$ characteristic (not shown in the Figures) is identical to that of $Q_r$. Equation A.8 shows that $Q_s=Q_r$, whatever $V_s$ and $V_r$, when the susceptances of the reactive elements $B_1$ and $B_2$ are conjugated.

Figure 11:
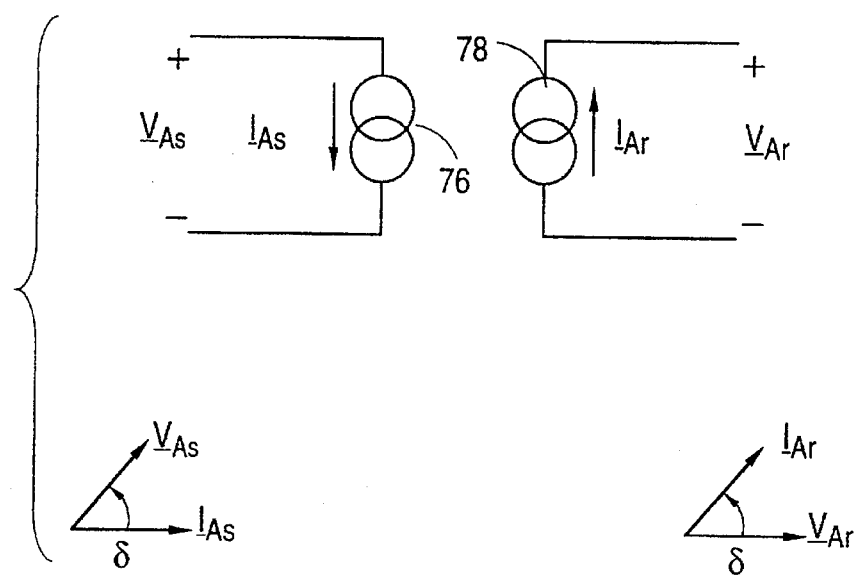
FIG. 11 is a diagram illustrating an equivalent circuit for an interconnecting apparatus according to the present invention, which has conjugated capacitors and inductors.

Referring to FIGS. 8 and 11, the connection of the reactive elements $B_1$ and $B_2$ between different phases of the two AC networks can be represented by a simplified equivalent circuit (shown in FIG. 11), provided that the susceptances of the reactive elements $B_1$ and $B_2$ are conjugated, transformer leakage impedance and all losses can be neglected. Under these conditions, the IPC behaves as two controlled current sources 76, 78. The amplitude of each current source 76, 78 is proportional to terminal voltage $\underline{V}_{As}$ or $\underline{V}_{Ar}$ on the opposite side of the IPC. According to FIG. 10, the power factor on both sides of the IPC is equal to $\cos(\delta)$. Thus, for a ±25° angle range centered at $\delta=0°$, the active power flow remains nearly constant even with fixed susceptances of the reactive elements $B_1$ and $B_2$. The reactive power varies almost in linear fashion with a curve equal to $-1$ p.u./rad. around 0°. Moreover, the IPC does not produce any harmonics when there is no phase control adjustment.

The 120 type IPC controls the active power in reliable and predictable fashion using reactive elements $B_1$ and $B_2$ with fixed susceptances. As long as the $\delta$ angle at the IPC terminals is maintained within a range of ±25°, it is not necessary to subdivide and switch the susceptances reactive elements $B_1$ and $B_2$ to regulate power flow. Switching is only necessary for changing the power level and for generating or absorbing a desired amount of reactive power.

The following discussion reports effects on the power characteristics of leakage impedance, terminal voltage and switching of the reactive elements $B_1$ and $B_2$ of the IPC. The IPC characteristics are virtually not affected by the short-circuit levels of the AC networks. The following characteristics are calculated for nominal voltage on each side and a transformer ratio n=1 (see FIG. 8). 1.0 p.u power is the rating of the IPC. The maximum susceptance values for the susceptances reactive elements $B_1$ and $B_2$ for all of the characteristics are −57.7% and +57.7%, respectively. Transformer leakage impedance is set at 10%.

Figure 12:
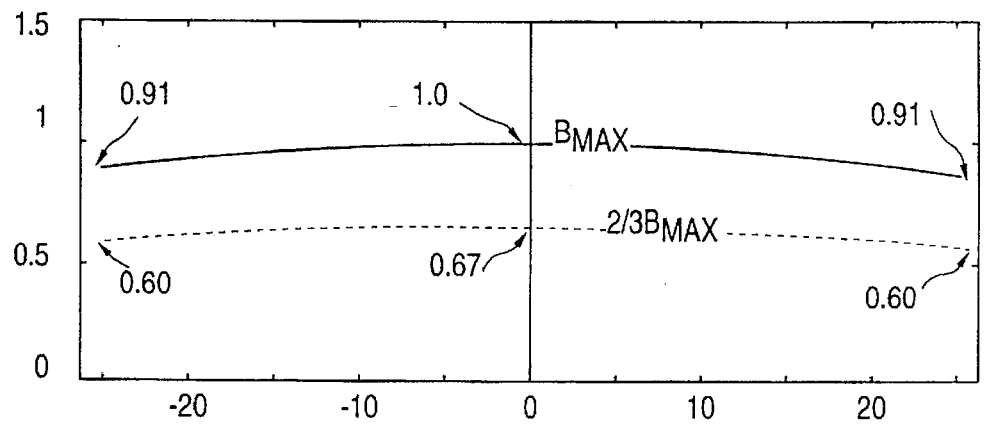
FIGS. 12 and 13 are diagrams illustrating active and reactive power characteristics on R-side of the interconnecting apparatus shown in FIG. 8.
Figure 13:
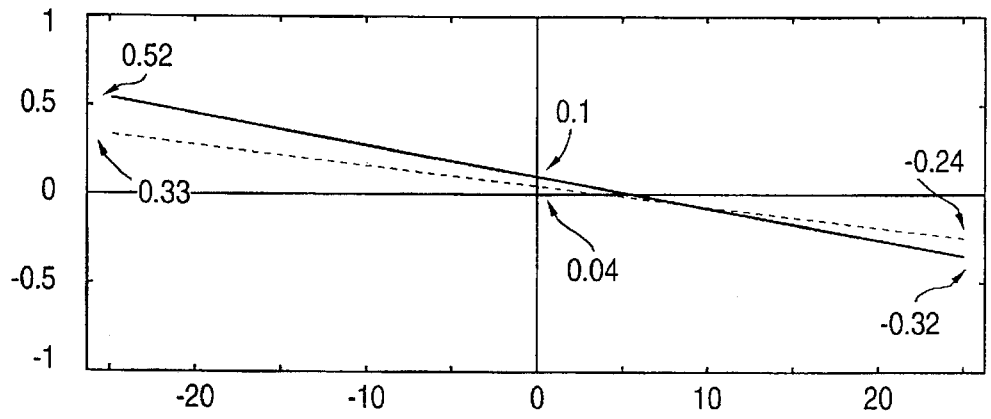
Figure 14:
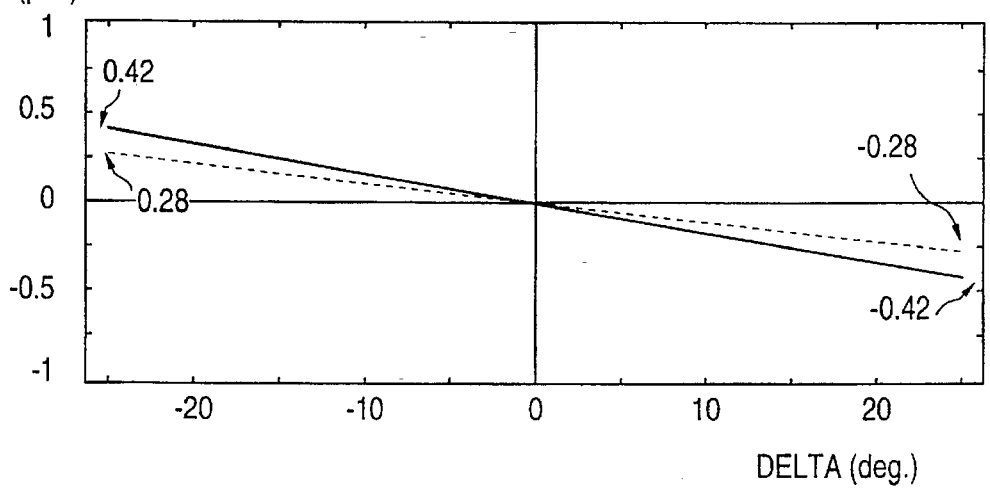
FIG. 14 is a diagram illustrating reactive power characteristics (on S side) of the interconnecting apparatus shown in FIG. 8.

Referring to FIGS. 12, 13 and 14, there are shown nominal operation characteristics of the a 120 type IPC. The angle range retained extends ±25° about $\delta=0°$ (see FIG. 10).

The operating range is sufficient for most applications of power exchange between two neighbouring subsystems. The solid and broken curves are plotted for the susceptances of the reactive elements $B_1$ and $B_2$ (see FIG. 8) at their maximum value and at ⅔ of this value. The susceptances of the reactive elements $B_1$ and $B_2$ remain conjugated. The flow is thus directly proportional to the susceptances of the reactive elements and the shape of the power characteristics is not changed. The power flow decreases by 9.37% at $\delta=\pm25°$ and 3.4% at $\delta=\pm15°$. The reactive power on each side varies with a slope of −0.0169 p.u./deg. When the angular displacement between the sources is shared between the series impedances and the transformer's leakage impedance, and the direction of the flow is from "s" to "r", the angle directly located at the reactive element terminals decreases, which causes the reactive elements to generate more reactive power. This increase is visible on the "r" side where there is no transformer. The $Q_r$ characteristic is displaced to the right. On the "s" side, the transformer leakage impedance absorbs the reactive power generated by the reactive elements.

When the power flow is inverted with the susceptances of the reactive elements $B_1$ and $B_2$ having maximum absolute values, the power flow at $\delta=0°$ and the slopes of reactive power curves are the same but of opposite sign. The sensitivity of the power flow to $\delta$ does not change.

Figure 15:
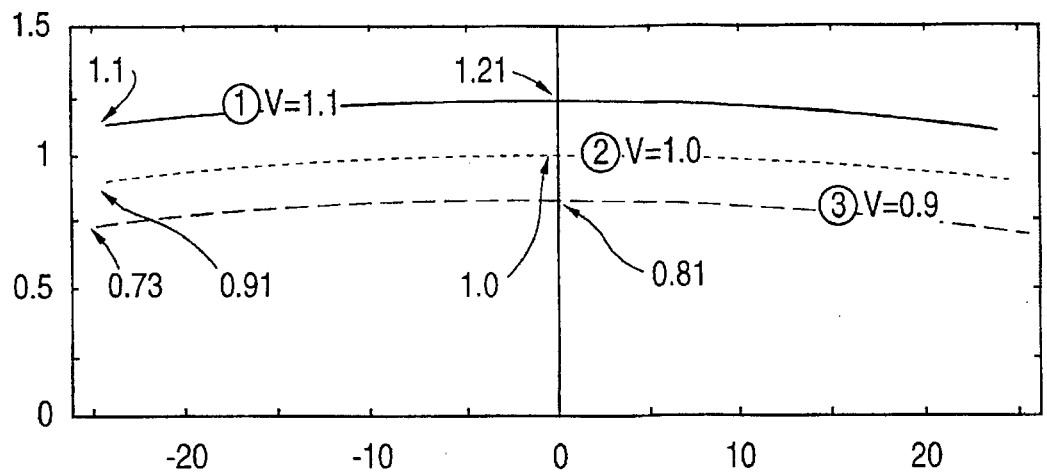
FIGS. 15 to 17 are schematic diagrams illustrating changes in power flow resulting from simultaneous variations in voltages on S and R sides of the interconnecting apparatus shown in FIG. 8.
Figure 16:
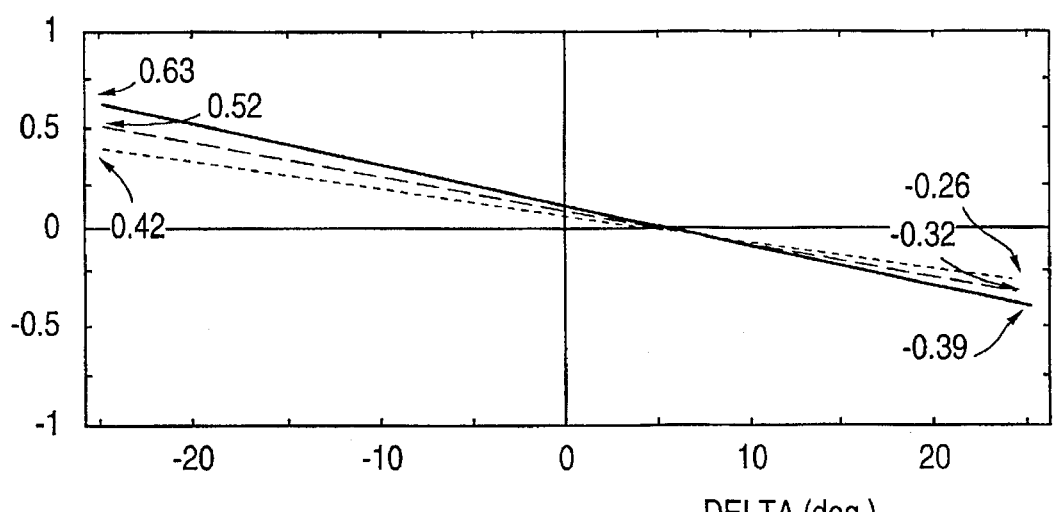
Figure 17:
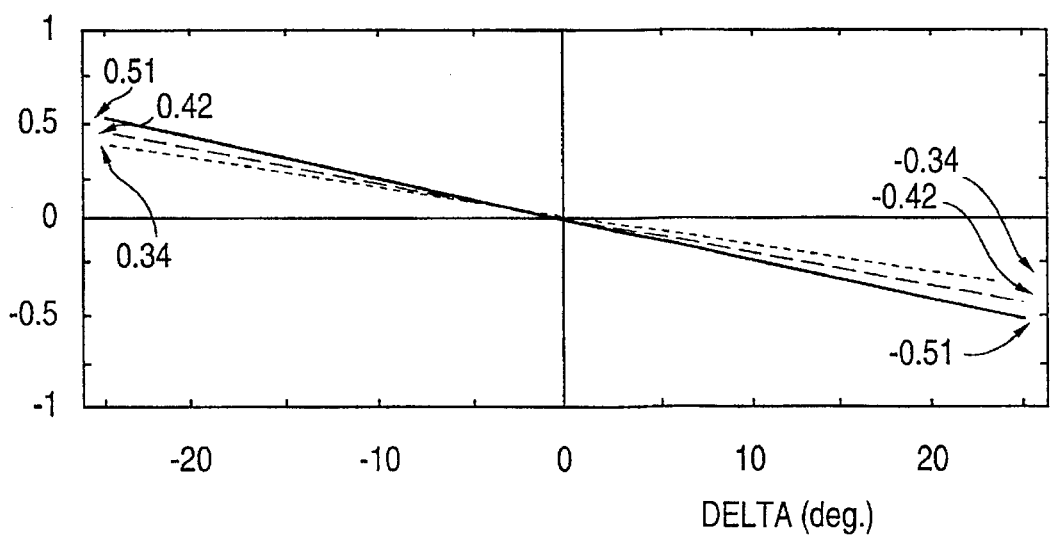
Figure 22:
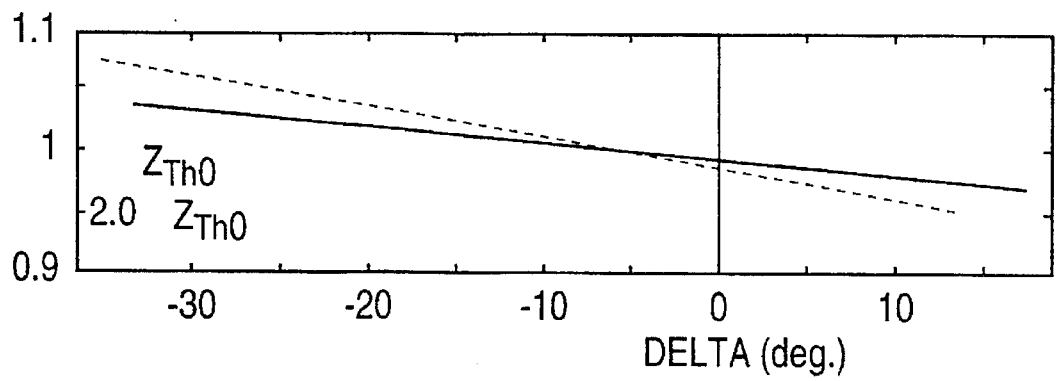
Figure 23:
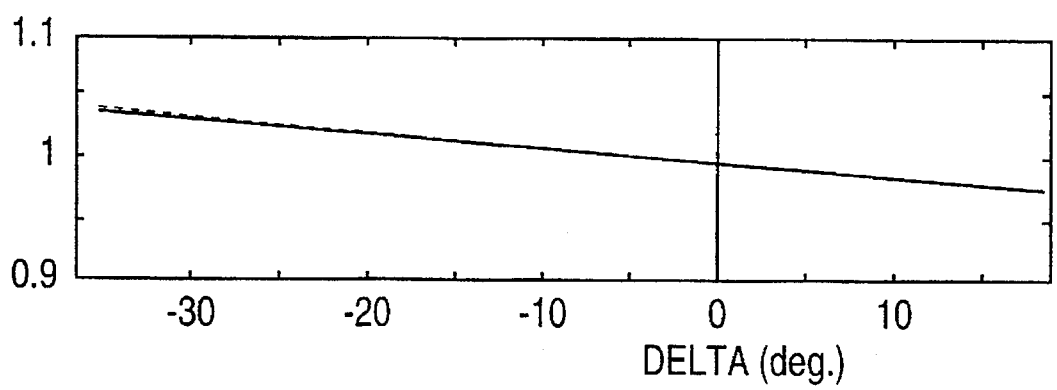

Referring to FIGS. 15, 16 and 17, the characteristics of the voltage at the IPC terminals are calculated for maximum power. Curve sets 1, 2 and 3 are plotted for voltages on each side of the IPC of 1.1, 1.0 and 0.9 p.u., respectively. In accordance with equation A.3, the increase in the power flow P is given by the product of two voltages. For instance, curve 1 shows a power increase of 21%, $(1.1)^2=1.21$. The variations in $Q_s$ and $Q_r$ are similar for an equal change in voltage on both sides. However, if the voltage increases by 10% on the "r" side only (not shown), the maximum reactive power increase of $Q_s$ is 4% and occurs at $\delta=-25°$. This demonstrates that voltage variations on one side of the IPC have no significant effect on the other side.

The power characteristics have a different shape when the susceptances of the reactive elements $B_1$ and $B_2$ are not conjugated, for example when one of the susceptances of the reactive elements $B_1$ and $B_2$ becomes nil.

When the susceptance of the reactive element $B_1$ is nil, active power decreases almost in linear fashion from −25° to +25°, passing from 0.61 to 0.35 p.u. The reactive power generated on each side by the IPC is 0.31 p.u. at $\delta=0°$ when only the capacitors $B_2$ are in the circuit. Under these conditions, the power flow is more sensitive to changes in the angle $\delta$. However, this is an unusual mode of operation for the IPC that should only be used when the AC networks are in a contingency situation. If reactive element $B_2$ is switched while the susceptance of the reactive element $B_1$ remains fixed, similar results can be inferred. The lowest active power transfer capability is at −25° rather than +25° and reactive power is absorbed instead of generated by the IPC ($Q_s$ and $Q_r$ are shifted by approximately −0.6 p.u.).

Referring to FIG. 18, there is shown a table which gives a summary of the operating points available from the 120 type IPC at nominal conditions.

Referring to FIGS. 19 to 23, there are shown the influence of the short-circuit impedance of the AC networks on the characteristics of the IPC. The rated power of the IPC at $\delta=0°$ is set at 1 p.u., while the corresponding AC network short-circuit power is 15 p.u. This is a short-circuit level which is representative of an urban area system. Under these conditions, the inductive and capacitive impedances of the 120 type IPC are each 25 times greater than the AC network short-circuit impedance $Z_{Th0}$ seen on each side of the IPC. The corresponding characteristics are plotted as a solid curve. If the Thevenin impedance of the AC network on the "s" side only of the IPC is increased by 100%, the active and reactive power characteristic are only slightly affected as shown by the broken curves. This 100% increase represents a severe contingency since the short-circuit level decreases by half. Thus, the daily and seasonal load variations in the AC networks as well as changes during maintenance periods or in contingency situations should not affect the behaviour of the IPC. It should be noted that during contingencies of such magnitude, the IPC can help to maintain the voltage by generating or absorbing reactive power while reducing the active power flow between the AC networks.

With reference to FIG. 8, when the reactive power of the 120 type IPC is 2.1 p.u, the amount of reactors $B_1$ and capacitors $B_2$ enables the IPC to maintain the power flow between 0.91 and 1.0 p.u. over an angle range of ±25° when the voltages at its terminals are both at 1.0 p.u. Losses are mainly located in the transformer 22 and reactors 81. Under the above conditions, the transformer losses are 0.34% and constant for the entire angle range. The reactor losses vary between 0.05% (δ=−25°) and 0.26% (δ=+25°). Losses are calculated using values that are typical for these types of apparatus. The total losses of the 120 type IPC thus vary approximately between 0.4 and 0.6%.

Based on the above-mentioned power characteristics for a 120 type IPC, two basic observations can be made as to its behaviour compared to transmission lines, with or without series compensation, and a phase-shifting transformers. These observations are general and apply to all IPC configurations:

the sensitivity of the power flow with respect to the angle at its terminals is low, while it is very high for transmission lines and phase-shifting transformers;

inversely, the sensitivity of the reactive power with respect to the angle at its terminals is relatively substantial, whereas transmission lines and phase-shifting transformers are not highly affected.

Thus, during disturbances, the IPC maintains a nearly constant active power transfer between the AC networks. If the disturbance is accompanied by a voltage change within the perturbed AC network, the error in the active power flow is dictated by the amplitude of the voltage change. Meanwhile the voltage of the healthy AC network is not affected. In addition, the inversion of the direction of the power flow due to angular displacement is for all practical purposes prevented. The IPC exhibits this type of behaviour in wholly passive fashion without generating any harmonics.

Figure 27:
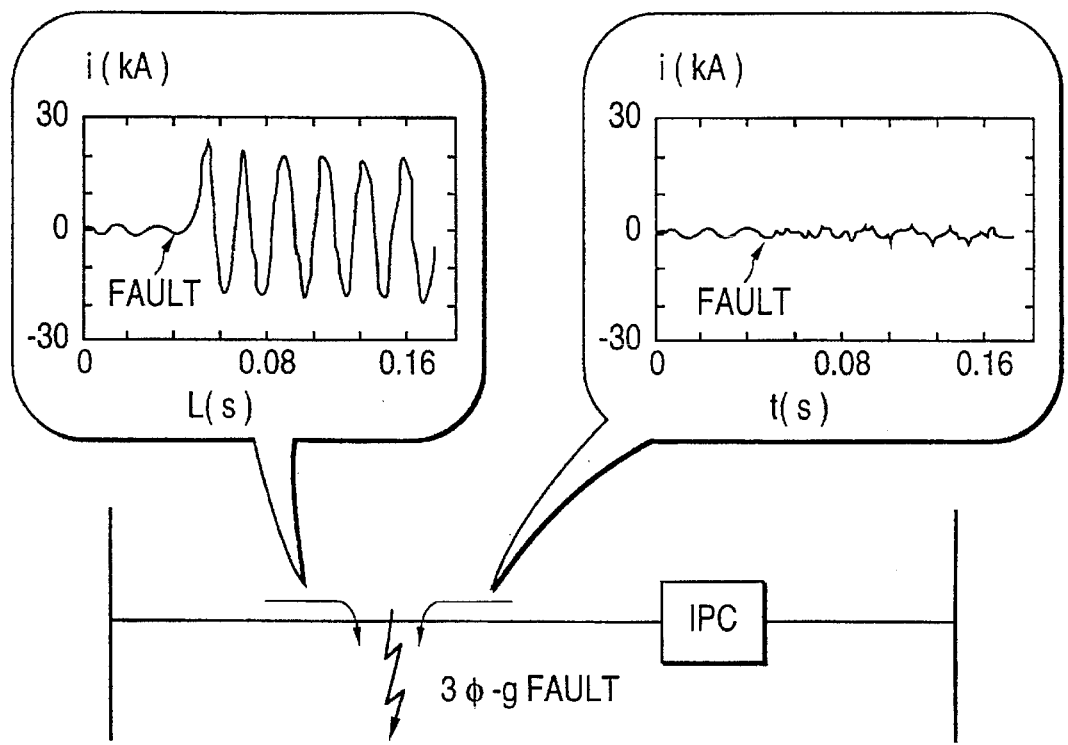
FIG. 27 is a schematic diagram illustrating fault-current-limiting effect of the interconnecting apparatus shown in FIGS. 2 and 25.

As above-mentioned, the IPC series impedances are substantially higher than the AC network short-circuit impedances. Considering a short-circuit on either side of the IPC, the series impedances limit the fault current. In the case of a three-phase short-circuit, each phase of the healthy AC network feeds a parallel LC circuit with a resonance frequency of 60 Hz, since the susceptances of the reactive elements $B_1$ and $B_2$ are conjugated. The appearance of the fault has therefore no significant effect on the increase in the total fault current, as depicted in FIG. 27. The net result is that the contribution to the short-circuit remains at the prefault current level (see FIG. 11). An interesting point regarding the 120 type IPC is that during a fault, the voltages applied to the reactive elements $B_1$ and $B_2$ are the same as during normal operation. The faults therefore do not create any particular voltage constraints to the IPC.

Should the circuit breaker on one side of the IPC open, the AC network still connected to the IPC supplies three series LC circuits with a resonance frequency of 60 Hz. In order to avoid that the voltages at the midpoint of the LC series circuits become dangerously high, varistors may be installed on each side of the reactive elements $B_1$ and $B_2$.

With the IPC operating under normal conditions, a series resonance phenomenon can occur with the equivalent reactance of the AC networks. To illustrate this phenomenon, it is possible to replace the IPC by its frequency equivalent. This equivalent simply consists in a series capacitor which is identical to the one in the IPC. An eigenvalue study has shown that this equivalent adequately represents the resonance frequencies with an accuracy of 10% providing that the IPC impedances are at least 10 times that of the interconnected networks. Based on this equivalent, it can be deduced that where the 120 type IPC impedances are equal to 15 times the AC network impedances, the resonance frequency is approximately:

$$f_r \cong 60 \sqrt{X_C/X_{Th}} = 60\sqrt{15} = 232 \text{Hz} \qquad (A.9)$$

Since this value is not close to 60 Hz (frequency of the AC networks in North America), it does not present operational problems similar to those found with series compensation where subsynchronous resonances may occur.

Although the interconnecting apparatus (IPC) for controlling the flow of power within AC networks is a passive device constructed from conventional elements (transformer, capacitors, reactors and circuit-breakers), it is in no way limited to passive control of the power flow between two AC networks. As such, it can potentially be used for AC network applications where a flexible adjustment of the power flow is required along with voltage support, both in steady and dynamic states.

The following description discusses one application of the IPC for power flow control within AC networks.

Figure 24:
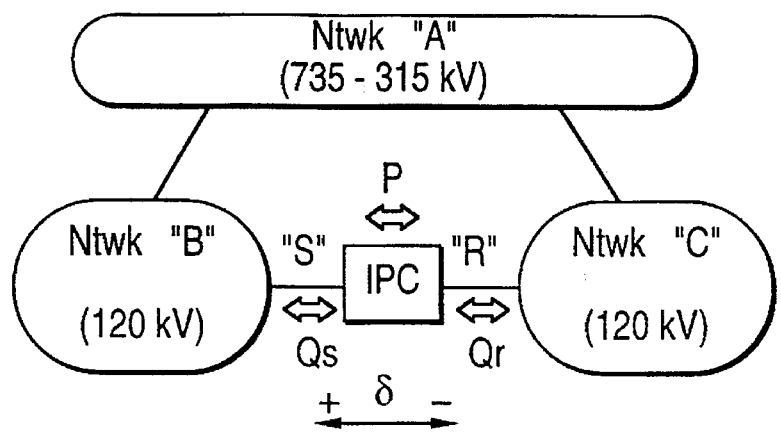
FIG. 24 is a schematic diagram illustrating an application of an interconnecting apparatus according to the present invention.

Referring to FIG. 24, the application considers the interconnection of two isolated but synchronous 120-kV subnetworks "B" and "C" by closing a tie normally kept open because of high short-circuit level constraints.

For the application study, a 120-kV subtransmission system is selected because it comprises a number of subnetworks that are operated radially because of high short-circuit levels. In this application, the IPC is used to provide additional supply between the subnetworks, without increasing the short-circuit levels. The main transmission system (network "A") is a 735-kV loop supplying 315-kV and 120-kV subnetworks. As loads on the system generally increase with time, supply to some of the 120-kV subsystems must be strengthened. The normal solution consists in adding new links as well as transformers in a radial operating mode in order to maintain a firm power supply. An alternative solution would be to interconnect subnetworks, but this is possible only if the total short-circuit current is kept lower than the interrupting capability of the circuit-breakers. Another aspect of the problem is that the slightest variation in the voltage and phase angle between the ends of the tie-line can have a considerable effect on the flow of active and reactive power and even cause the reversal of the active power flow. The final consequence of these factors is that the interconnection of two subnetworks may worsen the situation by overloading equipment.

The alternative solution proposed can be implemented in various ways through the use of IPCs, according to the invention. The choice of the IPC topology is based on several determining factors such as:

range of phase angle δ to be covered between the two subnetworks;

maximum voltage variations in the AC subnetworks;

type of contingency that the proposed equipment should be able to handle (short-circuit followed by loss of line, etc.);

performance required in terms of speed and accuracy;

voltage level on which the IPC is connected.

The angle range to be covered corresponds to the maximum possible angle difference between the two AC subnetworks. Many factors influence this range, such as seasonal load conditions (summer and winter), the topology of each network as influenced by equipment maintenance, generation management, etc. The permissible voltage variations determines the maximum Mvar rating (inductive or capacitive Mvar) which can be switched on a given AC network. The equipment must remain connected during any disturbances on either of the two AC subnetworks. For instance, the line loss caused by a short-circuit will alter the angle between the two AC networks as well as the voltages applied to the IPC components. The desired performance may vary from one application to another. In some applications, only constant power control is required, while others may require the capability to modulate the power transmitted during the disturbance.

Figure 25:
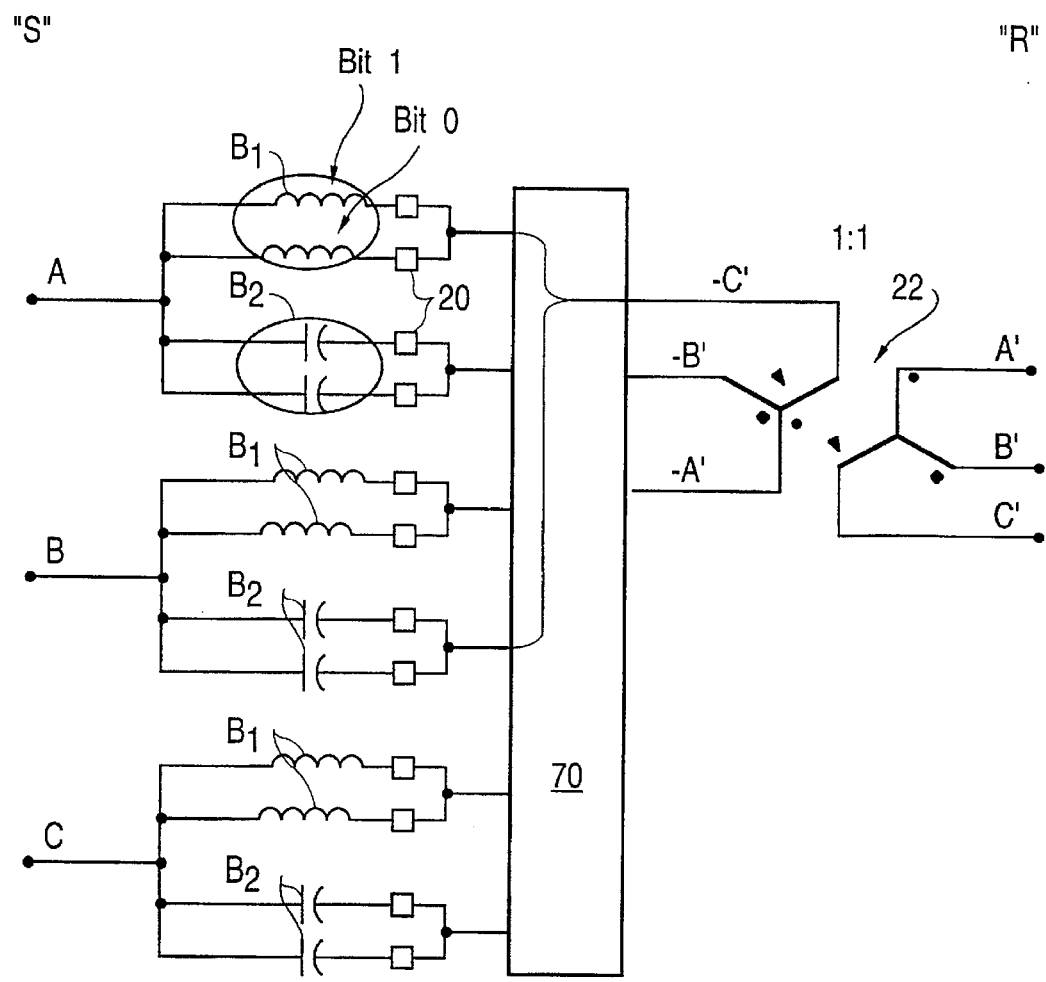
FIG. 25 is a schematic diagram illustrating the interconnecting apparatus shown in FIG. 2, with additional power control adjusting elements.

In reference with FIG. 25, the IPC consists of inductive and capacitive elements ($B_1$ and $B_2$) connected between different phases of the two AC subnetworks "B" and "C". Each relative element $B_1$ and $B_2$ comprises one or more components whose weight can follow a binary (bit) progression. Such an arrangement allows a step-wise control of the power exchange between two synchronous AC networks. Various topologies of the IPC are possible, some with transformers and others without. The number of bits in each relative element $B_1$ and $B_2$ depends on the number of operating points required as well as the maximum permissible voltage change on the AC network caused by the switching of the relative elements $B_1$ and $B_2$. From a practical point of view, the number of bits for each relative element is limited by cost.

The IPC configuration selected in FIG. 24 is a 120 type. This topology uses two components (bits) for each relative element $B_1$ and $B_2$. This allows 15 functional operating points for each direction of active power flow. Power reversal switches 70 are used to reverse the direction of power flow. The power flow in the IPC is a function of the susceptances of the reactive elements $B_1$ and $B_2$ in operation and is not significantly affected by the angle between its terminals.

Referring to FIG. 26, there is shown a table of the 15 functional operating points of the IPC shown in FIG. 25 for each combination of bits with rated voltage on each side of the IPC and for a zero degree phase shift between its terminals. In addition, by modifying the reactive element connections, 15 other identical operating points can be obtained, with an inverted power flow. Each bit of the $B_1$ reactive element has a conjugated counterpart in the $B_2$ reactive element so that the same reactive power is generated or absorbed on each side of the IPC (neglecting the transformer leakage impedance). Operating points 5, 12 and 16 show the three operating points close to unity power factor.

For a 1-bit IPC, only operating points 1, 7, 10 and 16 would be available.

During start-up of the IPC, the sequence in which the bits are switched can help support the voltages. For instance, if the voltages are greater than the rated value, the operator may select sequence 2, 5, 11 and 16 in order to favour intermediate operating points where reactive power is absorbed rather than generated. On the other hand, if the voltages are low, the operator may opt for sequence 3, 5, 13 and 16, thus favouring the generation of reactive power. The shutdown sequence follows the same rules as for the start-up. The operating points could be changed by means of a programmable control to optimize the operating sequence, minimize equipment stress and reduce time delays. For instance, capacitors that are already energized cannot be brought back into service before the trapped charge is discharged. This can create a delay of a few minutes.

The various contingencies which may occur on the sub-transmission system can cause a temporary overload of adjacent lines and transformers. The situation can be manually corrected within a few minutes. Where an operator's intervention is not desirable, it is possible to install a control to detect overloads and select a new operating point according to the type of contingency.

Figure 28:
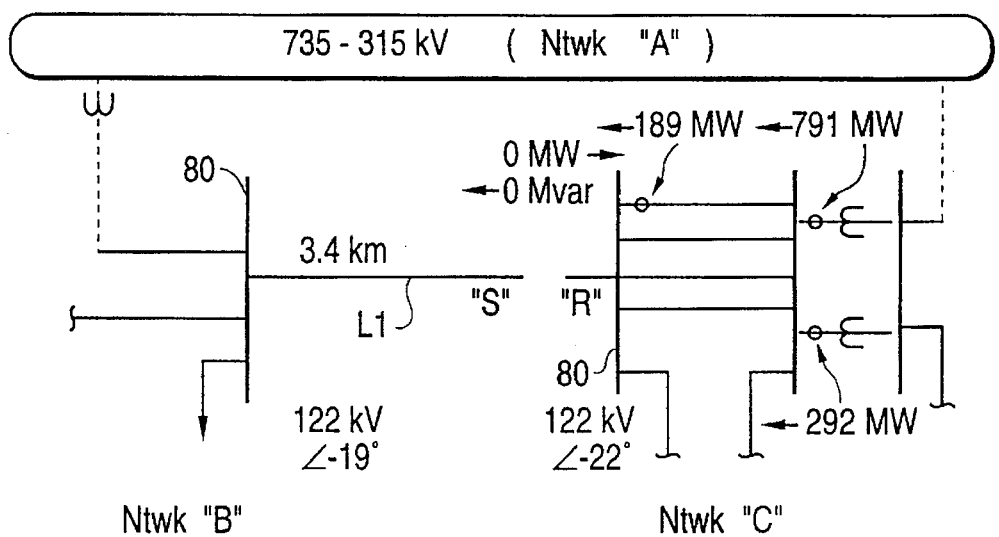
FIGS. 28 to 32 are schematic diagrams illustrating examples of power flow with and without the interconnecting apparatus shown in FIGS. 2 and 25.

Referring to FIG. 28, there is shown a simplified diagram of two 120-kV radial networks "B" and "C" which can be connected through a short (3.4-km) line LI. The line LI is normally open at one end in order to maintain the short-circuit current below the interrupting capability of the 120-kV circuit-breakers 80. The phase angle difference at the circuit-breaker terminals is about 3°.

FIGS. 28 to 32 give a few simulated examples of power flow with and without the IPC. Only the operating conditions corresponding to the 200 MW maximum power flow are shown (point 16 in table of FIG. 26).

The power flow diagrams with the IPC show that the operating points differ slightly from the theoretical cases of the table in FIG. 26 for both power flow directions. These differences are due to the fact that voltages differ slightly from the nominal value and that angle δ is not equal to zero, which can be predicted from the P-Q characteristics.

The diagrams show the salient characteristics of the IPC:

efficient management of the exchange of power between two synchronous AC networks;

limited sensitivity to the angle across its terminals;

efficient electrical decoupling between the AC networks on both sides.

A local control strategy can easily be implemented from external signals to adapt the operating point of the IPC (active and reactive power levels) to suit the needs of the two AC networks affected by contingencies such as external short-circuits and loss of a line or of a transformer. AC networks are subjected to daily and seasonal load cycles. The IPC makes it possible to reduce and even inverse the flow of active power and to absorb or generate reactive power. The table in FIG. 26 shows that the total reactive-power range available is between +122 and −110 Mvar for δ=0. This range of reactive power control can be used, in steps, to help regulate the voltage levels. The close proximity of cables may require additional reactive compensation during low load periods, which can be taken care of by the IPC.

Figure 29:
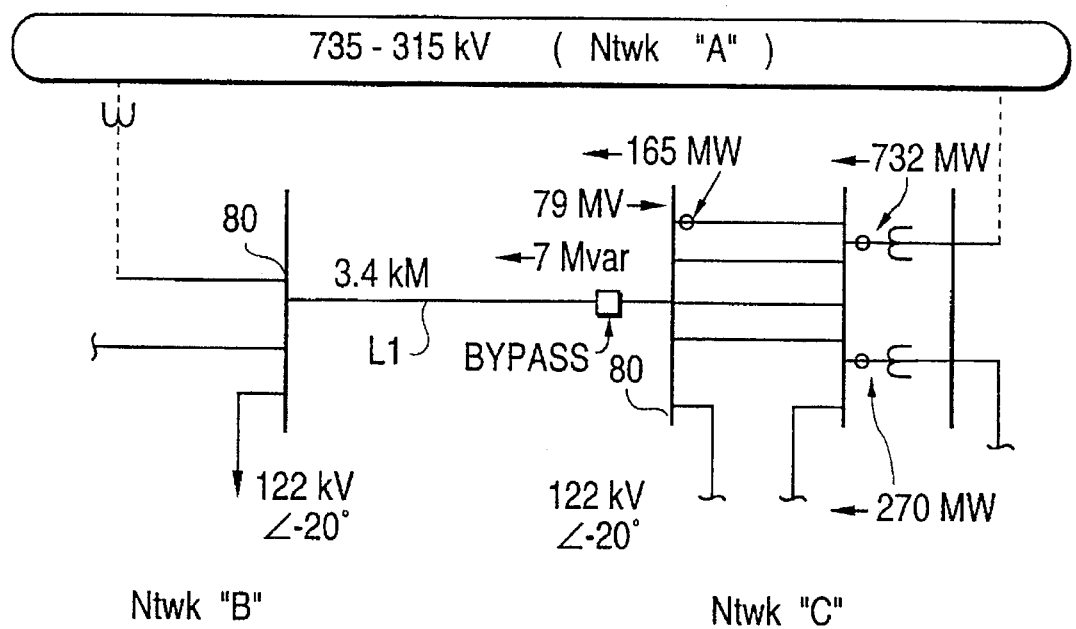
Figure 30:
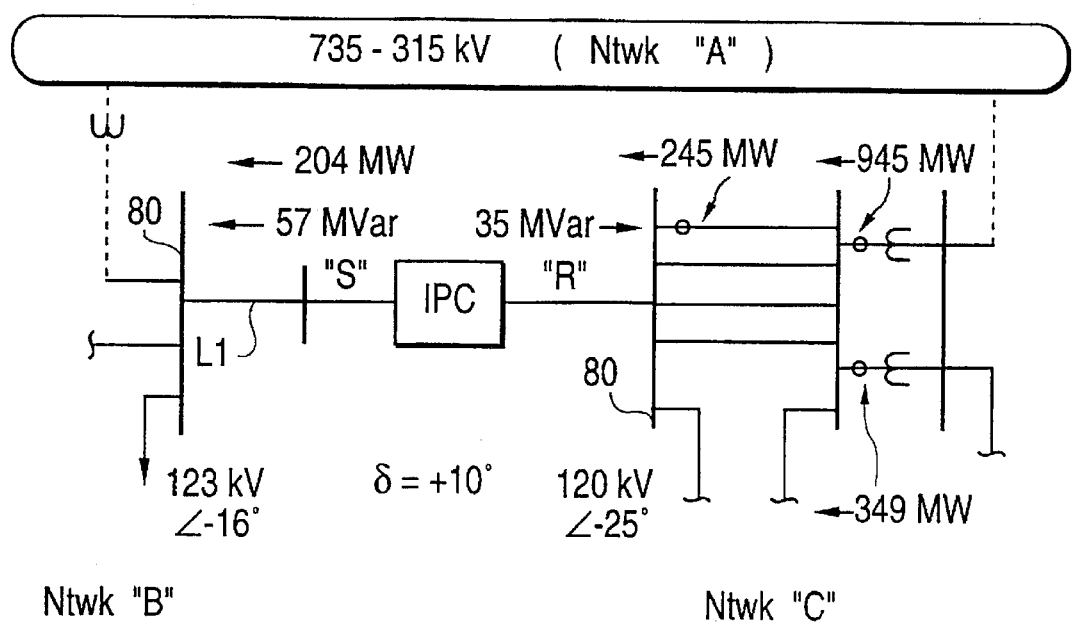

FIG. 29 shows the changes in power flow when the two AC subnetworks are connected by closing the normally open circuit-breakers 80. The amount of power and its direction depend on the difference in voltage and angle at the circuit-breaker terminals before it closes. An operator cannot predict the final result without using a power flow program; in the present case, 79 MW are injected into the network "C". Referring to FIG. 30, the simulations show the effects of contingencies in network C only. With a power flow established by the IPC from network "C" to network "B", a 204-MW flow is obtained with a total reactive power generation of 92 Mvar. This exemplifies the possibility of reversing the natural power flow with the IPC.

Figure 31:
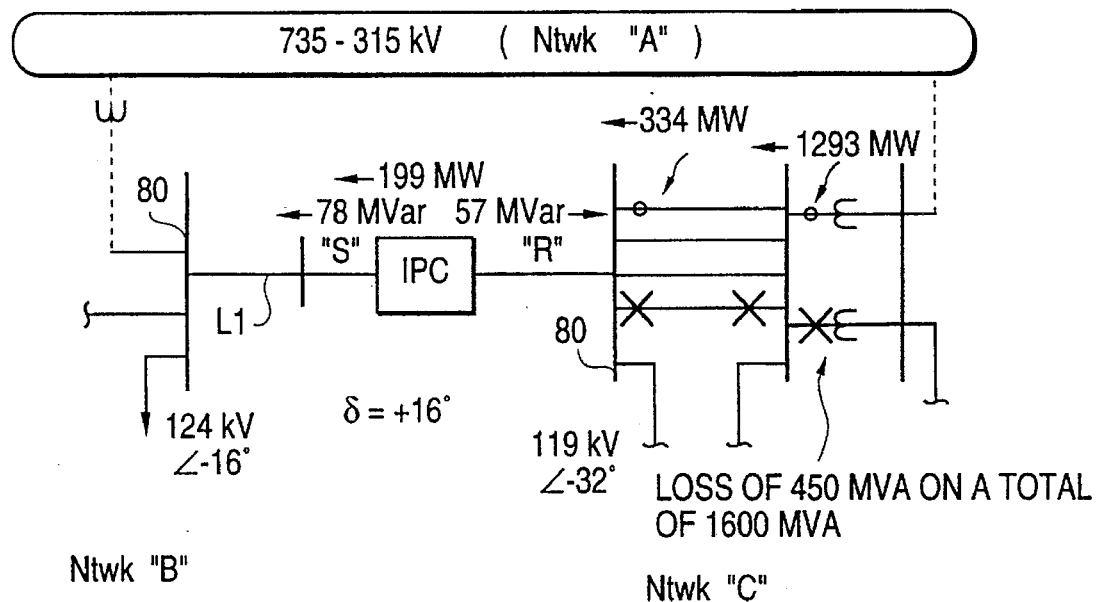

Referring to FIG. 31, the appearance of a double contingency, such as the loss of a 120-kV line and of a 450-MVA transformer, causes the overload of the remaining 120-kV lines. Despite these conditions, the IPC maintains a transfer of 199 MW; the phase shift at the IPC has increased to 16° and the total reactive power generated is 132 Mvar, thus creating a beneficial voltage support. The voltages on both sides remain at an acceptable level.

This example demonstrates the robustness of the inherent power control. However, an undesirable overload has occurred. The situation can be corrected with an appropriate action by an operator or an application-specific control. Indeed, the system can be returned to acceptable operating conditions simply by changing the operating point through circuit-breaker switching within the IPC.

Figure 32:
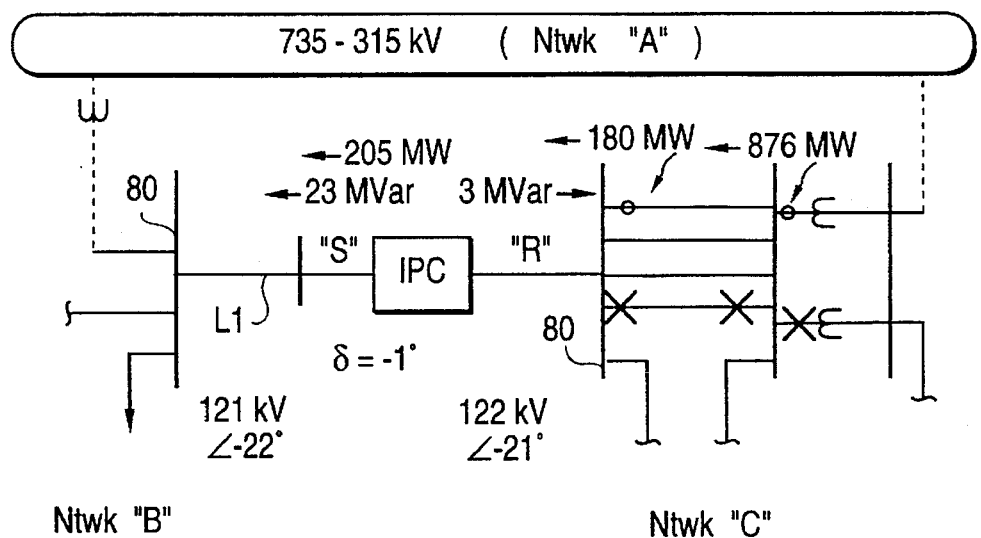

The effect is shown in FIG. 32 where the power flow is inverted. As a result, the power transmitted by the 120-kV circuits is reduced to 180 MW, thereby eliminating the overload.

The following description addresses the practical design aspects of a 200 MW 120 type IPC as shown in FIGS. 2 and 25 for the interconnection of two synchronous 120-kV AC networks that are close to their short-circuit limits. The MVA ratings of the IPC transformer 22 and reactive elements $B_1$ and $B_2$ are decided from steady-state operation requirements.

Neglecting the transformer leakage impedance and assuming $\delta$ equal to zero, the inter-phase connection of series elements with a 180° phase shift transformer 22 results in a voltage across the reactive elements $B_1$ and $B_2$ equal to the phase-to-ground voltage.

Figure 33:
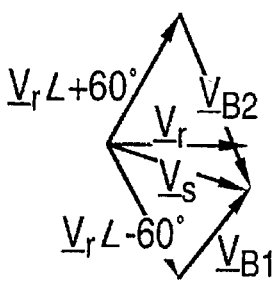
FIG. 33 is a table illustrating phase diagrams for different phase shifts between voltages on S and R sides of the interconnecting apparatus shown in FIGS. 2 and 25, and different power flow directions.
Figure 33:
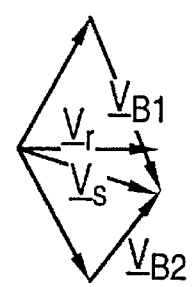
Figure 33:
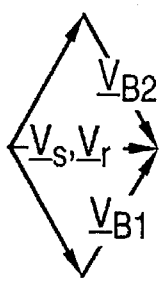
Figure 33:
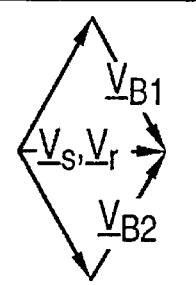
Figure 33:
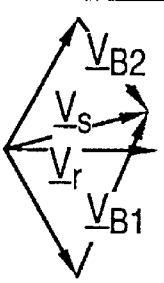
Figure 33:
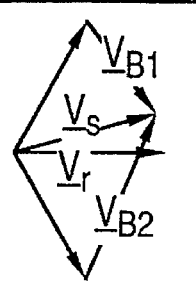
Figure 35A:
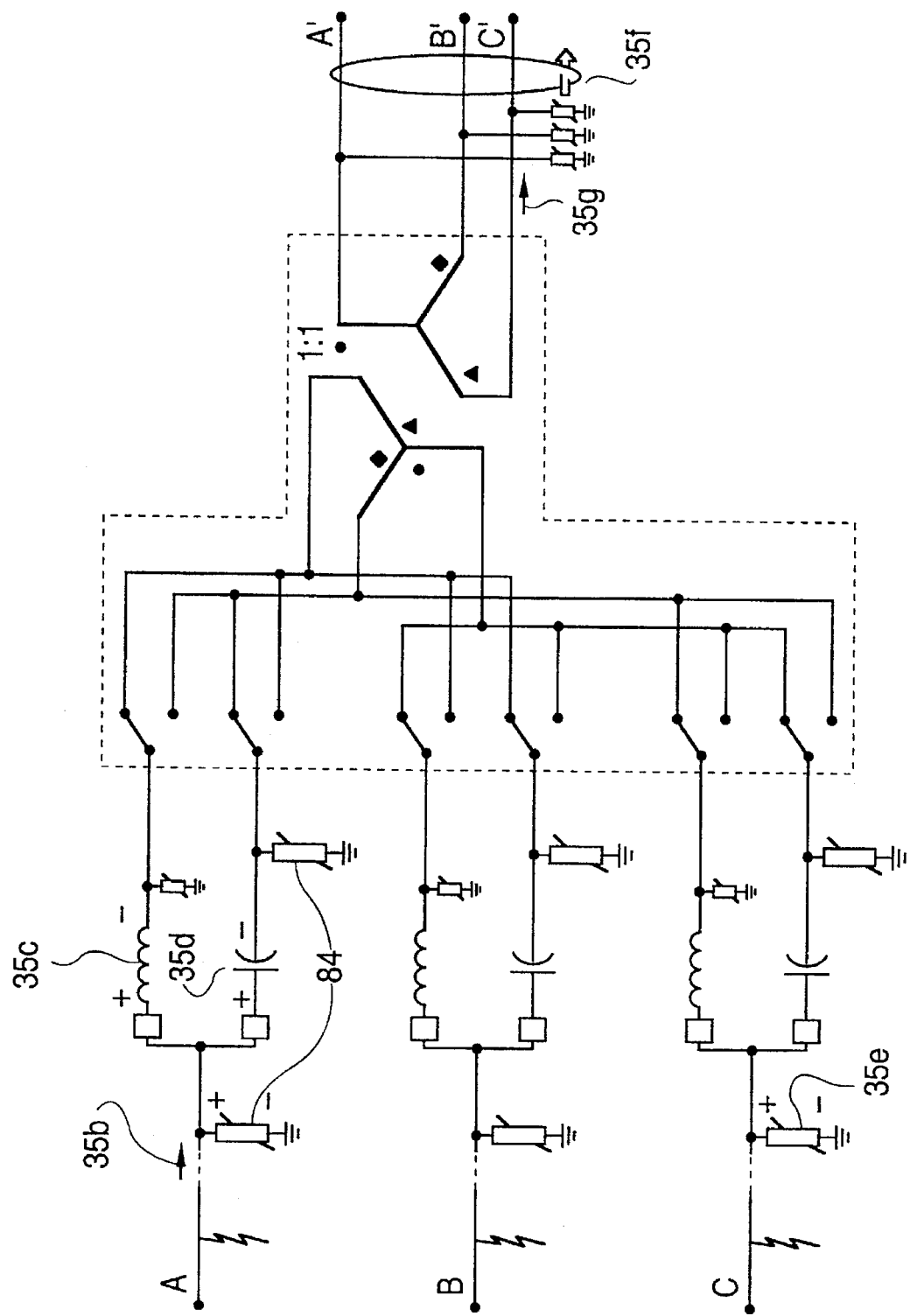
FIGS. 35a–g and 36a–g are schematic diagrams illustrating sample voltage and current waveforms at various points in the interconnecting apparatus shown in FIGS. 2 and 25, adapted for experimentation.
Figure 35B:
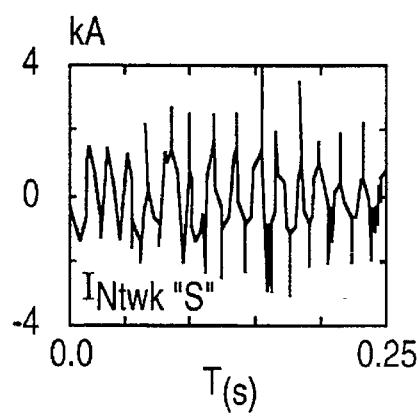
Figure 35C:
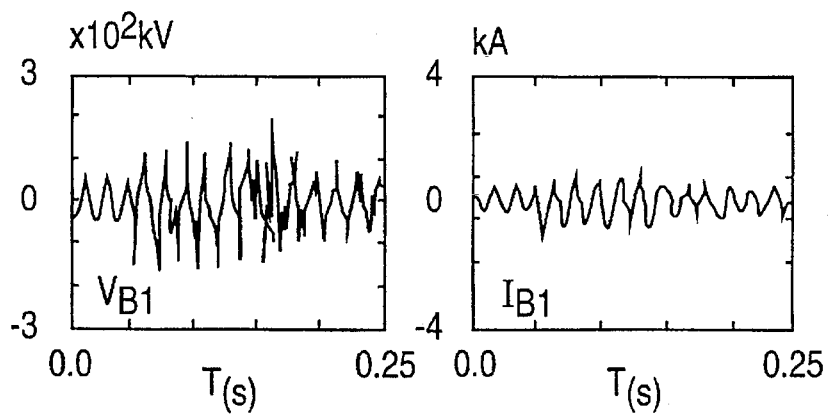
Figure 35D:
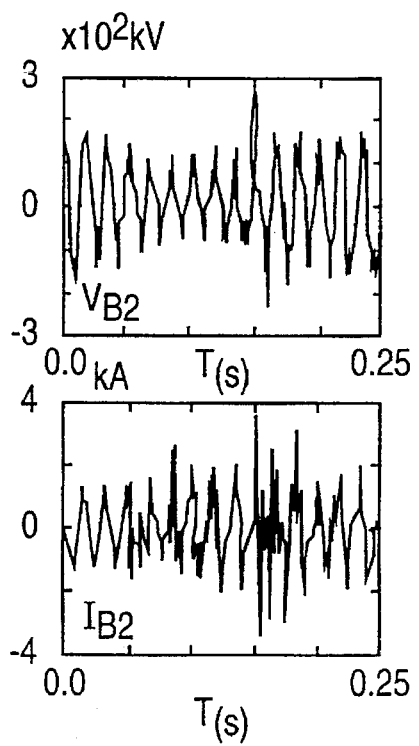
Figure 35E:
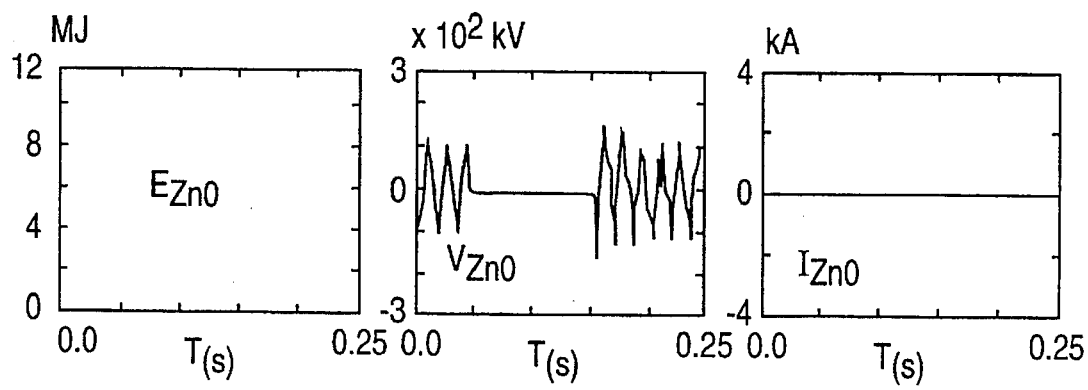
Figure 35F:
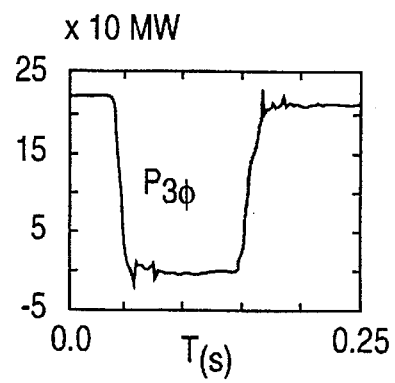
Figure 35G:
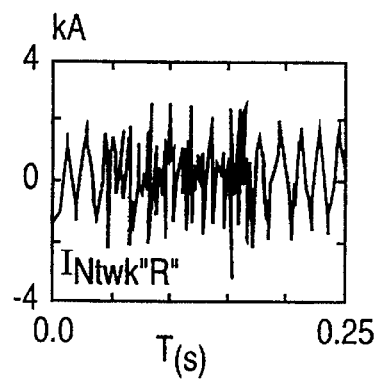

Referring to FIGS. 33 and 34, as the phase difference $\delta$ increases, the voltages across the reactive elements of an IPC are no longer equal. The phase diagrams (FIG. 33) shows the voltage across an inductor ($\underline{V}_{B1}$) and a capacitor ($\underline{V}_{B2}$) for different angles and for both directions of power flow. One can see how these voltages vary as the angle is moving away from zero in either direction. The reactor voltage $\underline{V}_{B1}$ increases as $\delta$ becomes positive with a power flow from "S" to "R" whereas the capacitor voltage $\underline{V}_{B2}$ decreases accordingly. If the power flow is reversed, the reactor voltage $\underline{V}_{B1}$ decreases as $\delta$ becomes positive whereas the capacitor voltage $\underline{V}_{B2}$ increases. Corresponding voltage and current design values as a function of $\delta$ and power flow direction are shown in the table of FIG. 34.

With a 10% over-voltage on each side of the IPC, the maximum steady-state voltages across the reactive elements $B_1$ and $B_2$ are 110 kV for capacitors and 86 kV for reactors. The reactive power installed is 335 Mvars of capacitors and 215 Mvars of reactors. For instance a 242 MVA transformer with a 132/132/13.8 kV ratio may provide the 180° required phase-shift. The transformer MVA is defined at 132 kV and maximum phase angle.

Referring to FIGS. 35a–g, there are shown an interconnecting apparatus and sample voltage and current waveforms for an event consisting in a six-cycle three-phase to-ground fault on the "S" side. The results show that, during the fault, the voltages across the reactive elements $B_1$ and $B_2$ are proportional to the phase-to-ground voltages on the source side (the IPC acts as a current source). The results also demonstrate the fault-limiting feature of the IPC. Finally, the stresses on varistors (MOV) 84 for that event are negligible.

Referring to FIGS. 36a–g, a second event simulates the unintentional opening of the breakers on one side; this creates a near 60 Hz series-resonant circuit in each phase of the IPC.

In order to protect the reactive elements $B_1$ and $B_2$ and the opened breakers from excessive over-voltages, Metal Oxide Varistors (MOV) 84 are connected phase-to-ground at the middle points. As the resonance phenomena is similar whether it occurs on either side, MOVs 84 are installed on both sides of the reactive elements, but only one set of MOVs 84 is stressed at a time. The maximum overvoltage is attained on the transformer secondary when the disconnection takes place on the "R" side. The resonance phenomena can be eliminated by opening the breakers of either the inductors $B_1$ or the capacitors $B_2$. Typical waveforms seen during an open condition followed by the disconnection of inductor $B_1$ are shown. This case corresponds to the highest energy absorption by the MOVs 84, because of the capacitor $B_2$ discharges in the MOVs 84.

The amplitude of the middle point voltage is a function of the susceptances of the reactive elements $B_1$ and $B_2$. The worst condition occurs when they are conjugated.

Referring to FIG. 37, there is shown a table of the maximum stresses on the various IPC components and the maximum energy absorbed during the 6 cycle-period following the IPC disconnection as shown in FIG. 36.

The most severe over-voltages across the circuit-breakers appear when they must open the series-resonant circuit. The capacitor branch breaker is the most stressed and must be equipped with two interrupting chambers whereas the inductor breaker needs only one.

Figure 36A:
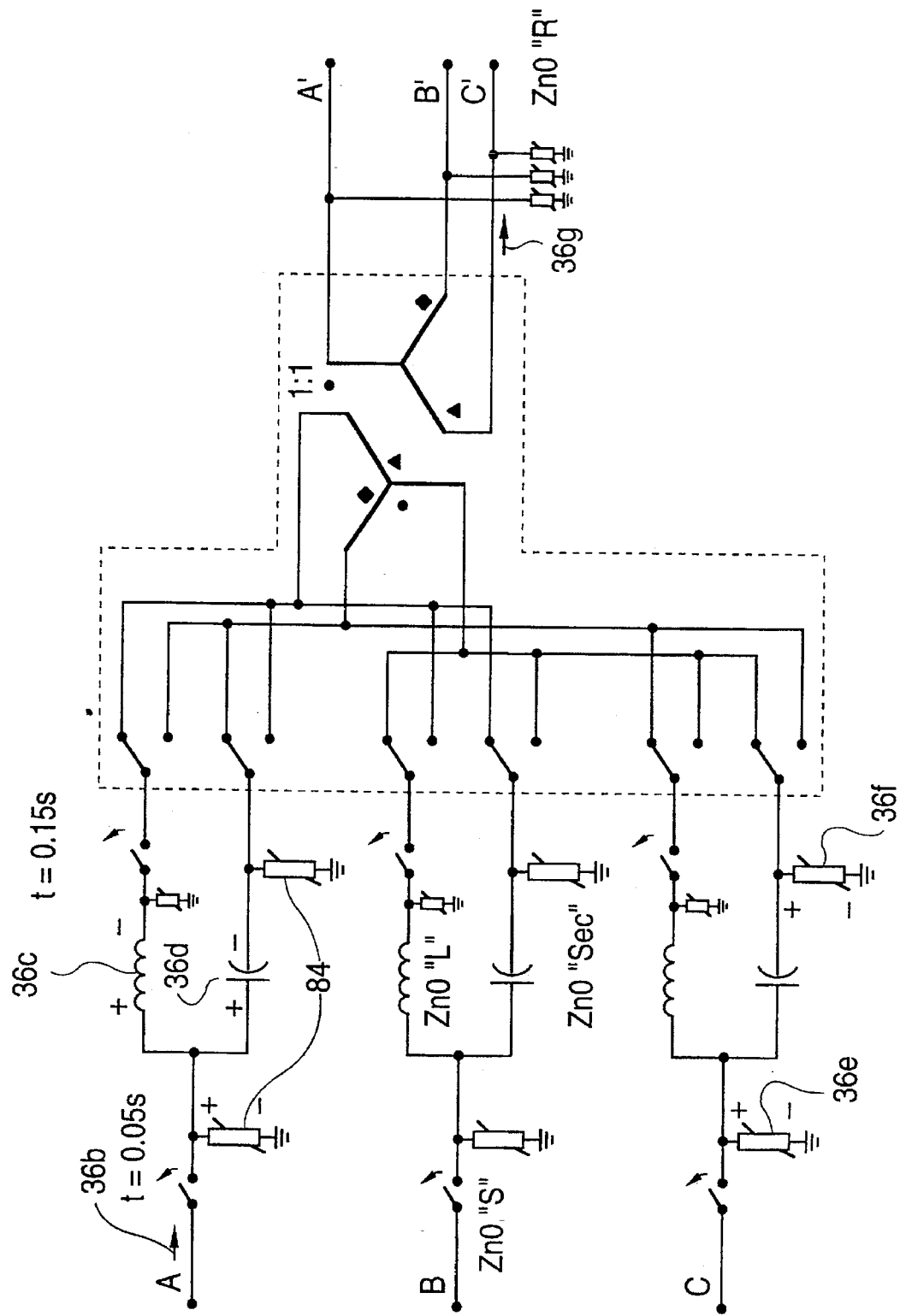
Figure 36B:
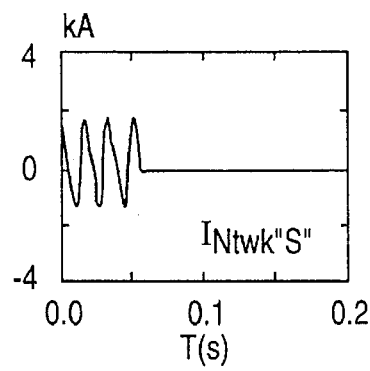
Figure 36C:
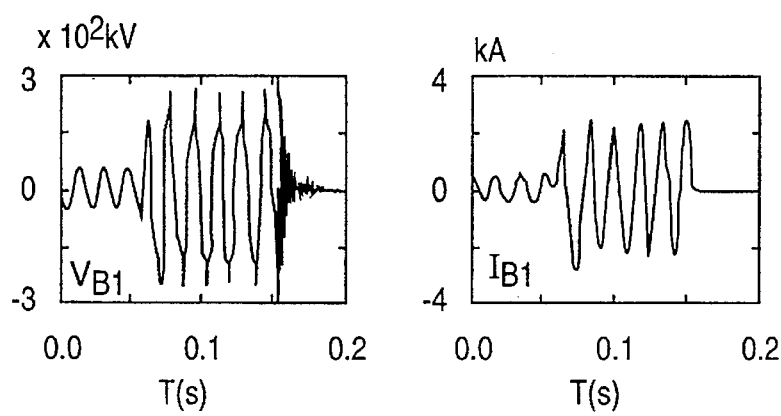
Figure 36D:
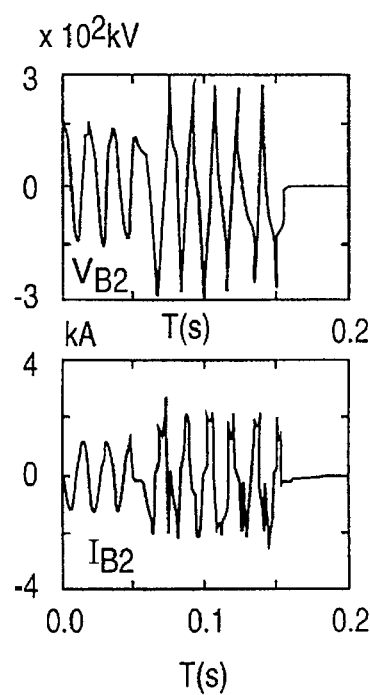
Figure 36E:
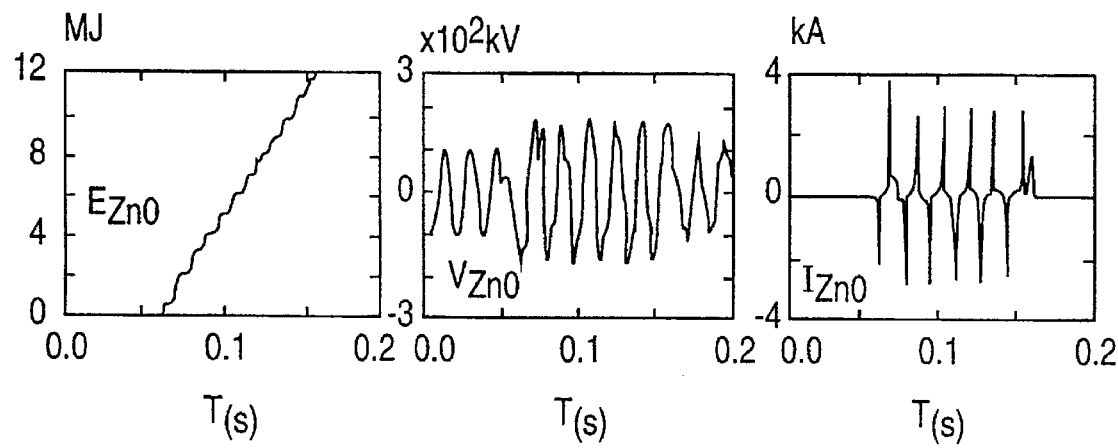
Figure 36F:
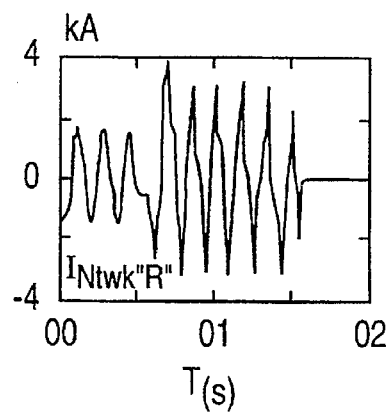
Figure 36G:
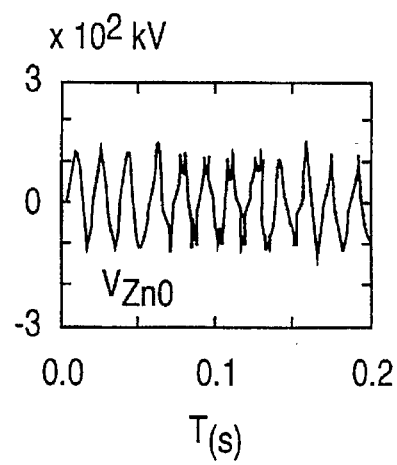

Referring again to FIGS. 36a–g, the voltage stresses seen by the equipment at different points during contingencies have been considered in the insulation coordination study. The maximum continuous operating voltage (MCOV) of the existing arresters on the 120-kV AC network is 86 kV. FIG. 36a shows the location of the varistors 84 required to protect the IPC from the resonant over-voltages when it is isolated from the AC network on one side. The MCOV of the IPC varistors, located on each side of the capacitors (ZnO "S" and ZnO "Sec."), is selected to be 80 kV. The 6 kV margin ensures that only the IPC varistors 84 will absorb the total energy associated with the isolation event. There remains a 4 kV margin above the maximum system operating voltage (76 kV).

The opening of either the breaker for $B_1$ or of $B_2$ eliminates the series resonance condition and the energy accumulation in the varistors 84 ceases as soon as one breaker opens even if the other fails to open. The two breakers are tripped simultaneously as soon as resonance conditions are detected. It is reasonable to assume that at least one breaker will trip. Therefore, the varistor energy can be based on resonance elimination within six cycles.

Figure 38:
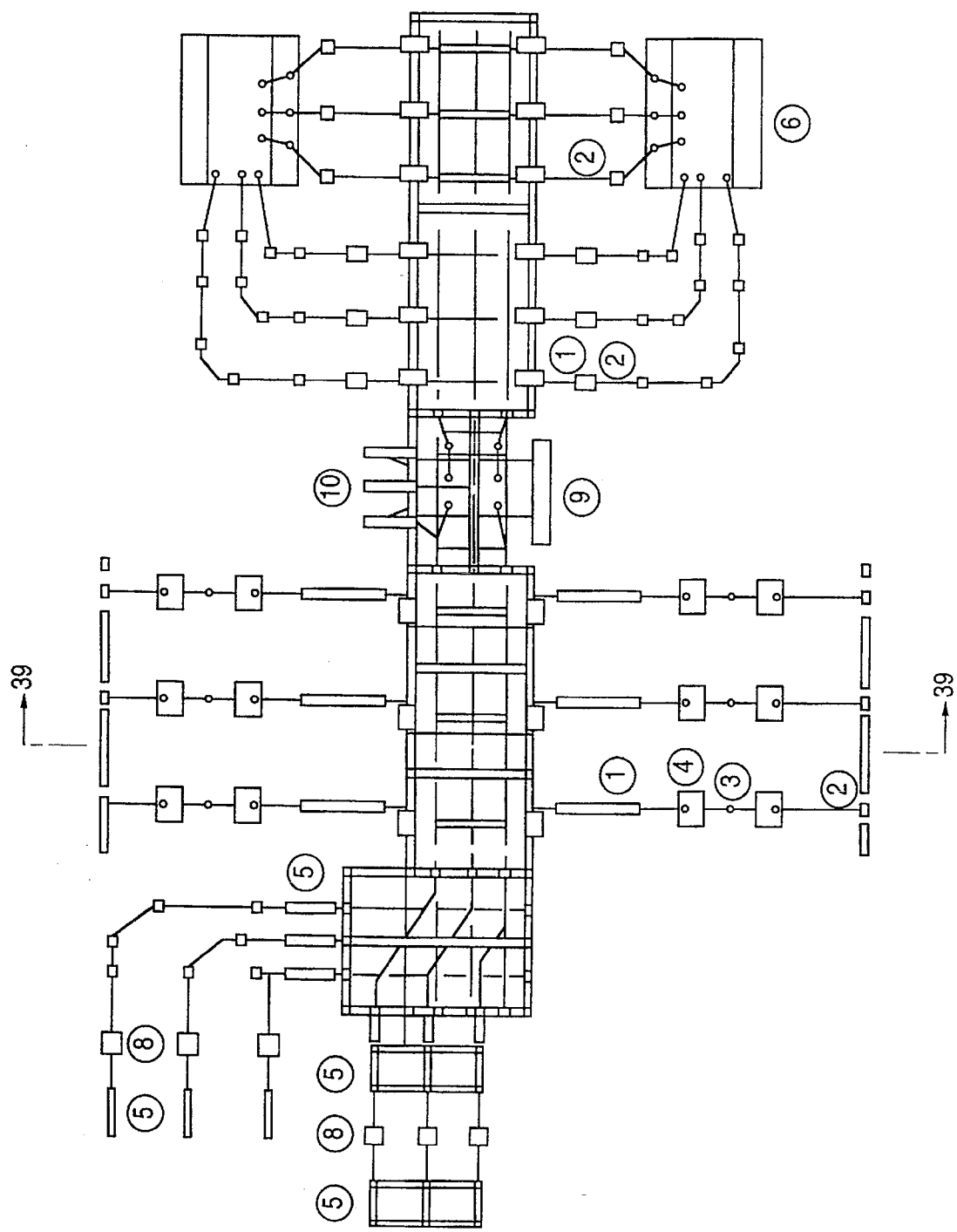
Figure 39:
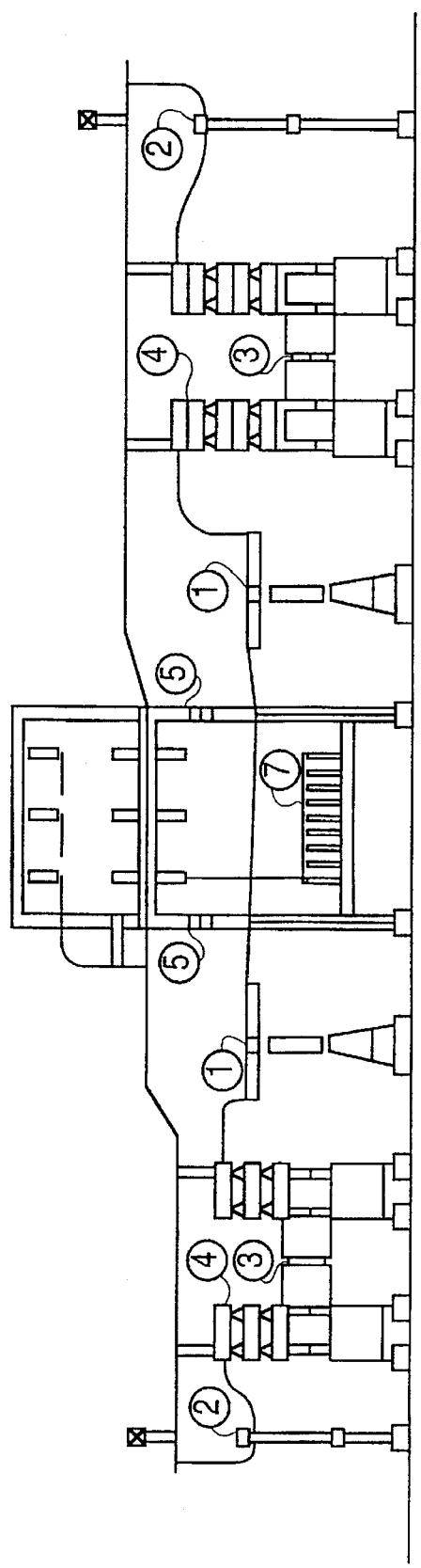
FIG. 39 is a cross-section view taken along the lines 39—39 shown in FIG. 38.

In a one-bit system, the inductive and capacitive elements are composed of one lumped three-phase branch each. In a two-bit system, two parallel inductive and two parallel capacitive three-phase branches of approximately ⅓ and ⅔ of the total required reactive power are used. The layout of the two-bit prototype shown in FIGS. 38 and 39 is particular to the actual application. It takes into account its integration in an existing substation. The total area required is a function of the number of bits constituting the susceptances. The area required for one bit is 1440 m² (15,000 sq. ft); for two bits, an area of 2260 m² (24,000 sq. ft) is required. No specific effort has been made to minimize the space taken by the prototype. Rather it was felt more appropriate to group together all three phases of each bit to facilitate the maintenance and the monitoring of the IPC. A possible reduction of 25% in the total area required is feasible, if there are no site-related constraints.

Figure 40:
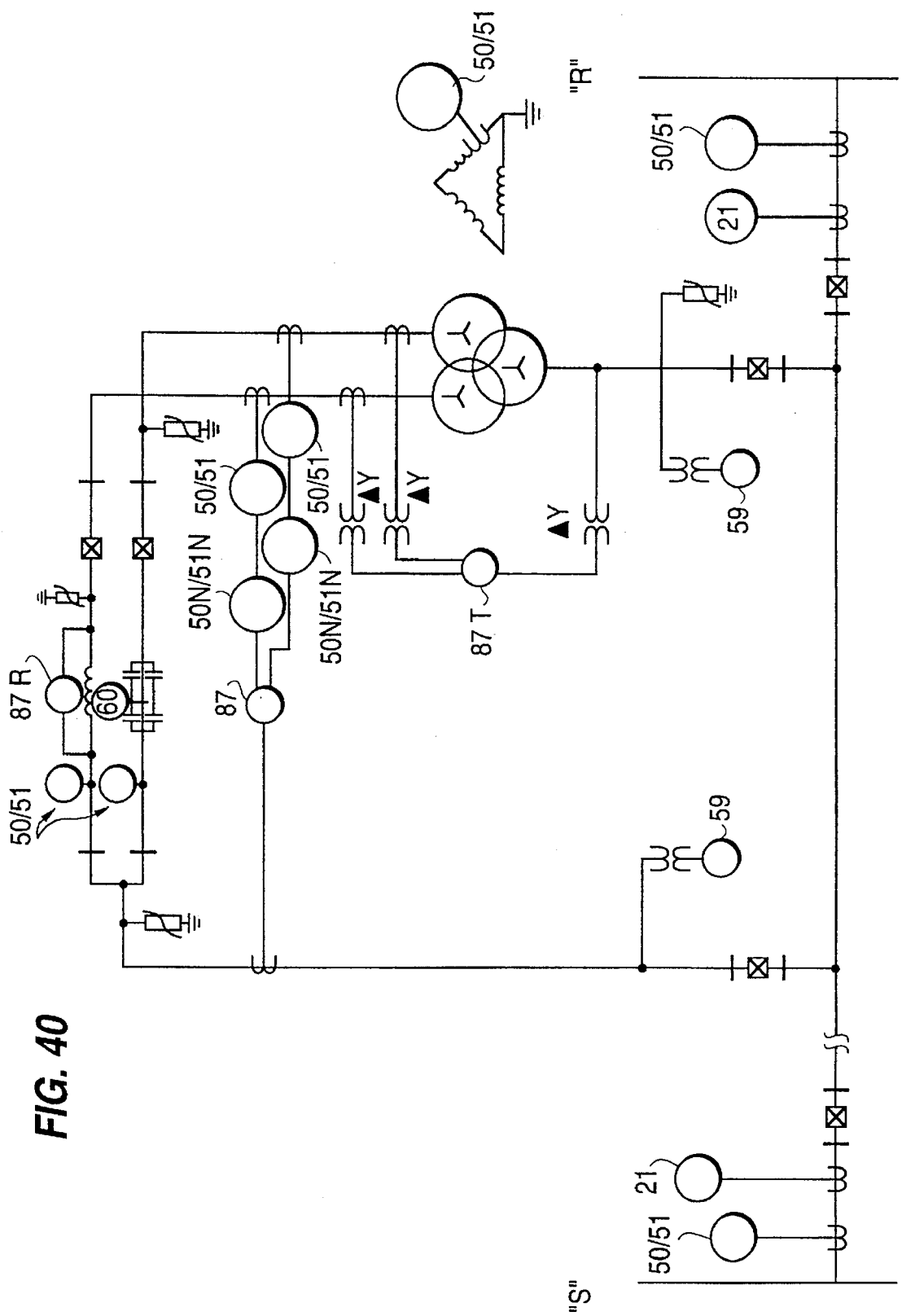
FIG. 40 is a single-line schematic diagram of a protection scheme of the interconnecting apparatus shown in FIGS. 38 and 39.

FIG. 40 presents a single-line diagram of a protection scheme. Each element of the IPC (reactor $B_1$, capacitor $B_2$, transformer) is protected individually. A differential protection detects internal bus faults and provides backup for the individual protection of the reactive components. It also disconnects the IPC in the case of conduction of the varistors (voltage rise due to single-side tripping). There is also an overvoltage protection on each side. Special consideration must be applied when selecting and coordinating the protection of the link between the IPC and neighbour station as the IPC prevents contribution to the fault from one side to the other. To allow tripping of the receiving end, the relay located at this end should be equipped with weak-end-infeed logic (WEI). This logic trips the local breaker and echoes the communication signal to the sending end. If the IPC is out of service and bypassed, a false tripping of the line could occur especially if zone 1 covers the complete length of the line. In this case the WEI should be disabled.

For short lines, which is the case for the present application, a pilot wire differential protection is recommended.

Although the present invention has been explained hereinafter by way of preferred embodiments thereof, it should be pointed out that any modifications to these preferred embodiments, within the scope of the appended claims, are not deemed to change or alter the nature and scope of the present invention.

We claim:

1. A method of interconnecting first and second synchronous polyphase AC networks having respective phase lines for regulating transfer of active power from one of said AC networks to the other of said AC networks, said method comprising the steps of, for each phase line of said first AC network:

(a) providing a first reactive element and a second reactive element, each said reactive element having a first end and a second end;

(b) connecting said first end of said first reactive element to said phase line of said first AC network;

(c) said connecting said first end of said second reactive element to said phase line of said first AC network;

(d) applying to said second end of said first reactive element a first phase voltage derived from said second AC network; and (e) applying to said second end of said second reactive element a second phase voltage derived from said second AC network, said second phase voltage being phase shifted with respect to said first phase voltage, one of said reactive elements being inductive and the other of said reactive elements being capacitive, whereby, in operation, a phase shift between said first phase voltage and said second phase voltage forces a regulated transfer of active power from one of said AC networks to the other.

2. A method according to claim 1, wherein said inductive element comprises a selected number of parallelled inductances, and said capacitive element comprises a selected number of parallelled capacitors.

3. A method according to claim 1, wherein:

each of said AC networks comprises three phase lines; and in said step (e), said first phase voltage has a substantially 240° phase shift with respect to said second phase voltage.

4. A method according to claim 3, wherein:

in said step (d), said second end of said first reactive element is directly connected to a first phase line of said second AC network; and in said step (e), said second end of said second reactive element is directly connected to a second phase line of said second AC network, said second phase line having a substantially 240° phase shift with respect to said first phase line of said second AC network.

5. A method according to claim 1, wherein:

each of said AC networks comprises three phase lines; and in said step (e), said first phase voltage has a substantially 60° phase shift with respect to said second phase voltage.

6. A method according to claim 5, wherein:

in said step (d), said second end of said first reactive element is connected to a phase terminal of first Δ-connected secondary windings of a three-phase transformer having Y-connected primary windings connected to said second AC network; and in said step (e), said second end of said second reactive element is connected to a phase terminal of second Δ-connected secondary windings of said three-phase transformer.

7. A method according to claim 1, wherein:

each of said AC networks comprises three phase lines; and in said step (e), said first phase voltage has a substantially 120° phase shift with respect to said second phase voltage.

8. A method according to claim 7, wherein:

in said step (d), said second end of said first reactive element is connected to a first phase terminal of Y-connected secondary windings of a three-phase transformer having Y-connected primary windings connected to said second AC network; and in said step (e), the said second end of said second reactive element is connected to a second phase terminal of said Y-connected secondary windings of said three-phase transformer.

9. A method according to claim 1, wherein:

each of said AC networks comprises three phase lines; and in said step (e), said first phase voltage has a substantially 180° phase shift with respect to said second phase voltage.

10. A method according to claim 9, wherein:

in said step (d), said second end of said first reactive element is connected to a phase terminal of Y-connected secondary windings of a three-phase transformer having Y-connected primary windings connected to said second AC network; and in said step (e), said second end of said second reactive element is directly connected to a phase line of said second AC network.

11. A method according to claim 5, wherein:

in said step (d), said second end of said first reactive element is connected to a first phase terminal of six-phase zigzag-connected secondary windings of a transformer having three-phase Y-connected primary windings connected to said second AC network; and in said step (e), said second end of said second reactive element is connected to a second phase terminal of said six-phase zigzag-connected secondary windings of said transformer.

12. A method according to claim 1, wherein:

each of said AC networks comprises three phase lines; and in said step (e), said first phase voltage has a substantially 30° phase shift with respect to said second phase voltage.

13. A method according to claim 12, wherein:
in said step (d), said second end of said first reactive element is connected to a phase terminal of Δ-connected secondary windings of a three-phase transformer having Y-connected primary windings connected to said second AC network; and
in said step (e), said second end of said second reactive element is directly connected to a phase line of said second AC network.

14. A method according to claim 12, wherein:
in said step (d), said second end of said first reactive element is connected to a first phase terminal of Y and zigzag-connected secondary windings of a three-phase transformer having Y-connected primary windings connected to said second AC network; and
in said step (e), said second end of said second reactive element is connected to a second phase terminal of said Y and zigzag-connected secondary windings, said second phase terminal being different from said first phase terminal so that said first phase voltage and said second phase voltage are phase shifted, said first phase voltage and said second phase voltage having substantially similar amplitudes.

15. A method according to claim 12, wherein:
in said step (d), said second end of said first reactive element is connected to a tap connection of a first phase terminal of a Y and zigzag-connected three-phase autotransformer connected to said second AC network; and
in said step (e), said second end of said second reactive element is connected to a second phase terminal of said Y and zigzag-connected three-phase autotransformer, said second phase terminal being different from said first phase terminal so that said first phase voltage and said second phase voltage are phase shifted, said first phase voltage and said second phase voltage having similar amplitudes.

16. A method according to claim 1, wherein:
said first AC network comprises six phase lines;
said second AC network comprises six phase lines;
in said step (d), said second end of said first reactive element is directly connected to a first phase line of said second AC network; and
in said step (e), said second end of said second reactive element is directly connected to a second phase line of said second AC network, said second phase line being different from said first phase line of said second AC network, said first phase voltage having a substantially 60° phase shift with respect to said second phase voltage.

17. A method according to claim 1, comprising an additional step of disconnecting one of said reactive elements in operation.

18. A method according to claim 1, wherein said steps (d) and (e) comprise modifying amplitudes of said first phase voltage and said second phase voltage with respect to amplitudes of line voltages provided by said second AC network.

19. A method according to claim 17, comprising an additional step of changing a voltage level of at least one of said first phase voltage and said second phase voltage.

20. A method according to claim 1, comprising an additional step of switching a phase voltage applied to said second end of said first reactive element to said second end of a corresponding said second reactive element and vice versa.

21. An interconnecting apparatus for interconnecting first and second synchronous polyphase AC networks and for regulating transfer of active power from one of said AC networks to the other of said AC networks, each of said AC networks having a plurality of phase lines, said apparatus comprising, for each of said phase lines of said first AC network:
a first reactive element having a first end and a second end, said first end being provided with first connecting means for connecting said first reactive element to said phase line of said first AC network;
a second reactive element having a first end and a second end, said first end being provided with second connecting means for connecting said second reactive element to said phase line of said first AC network;
first connecting and transformer means for applying to said second end of said first reactive element a first phase voltage derived from said second AC network; and
second connecting and transformer means for applying to said second end of said second reactive element a second phase voltage derived from said second AC network, said second phase voltage being phase shifted with respect to said first phase voltage, one of said reactive elements being inductive and the other of said reactive elements being capacitive, whereby, in operation, a phase shift between said first phase voltage and said second phase voltage forces a transfer of active power from one of said AC networks to the other.

22. An apparatus according to claim 21, wherein each said inductive element comprises a selected number of parallelled inductances, and each said capacitive element comprises a selected number of parallelled capacitors.

23. An apparatus according to claim 21, wherein:
each of said AC networks comprises three phase lines; and
each said first phase voltage has a substantially 240° phase shift with respect to a corresponding said second phase voltage.

24. An apparatus according to claim 23, wherein:
each said first connecting and transformer means is formed by a short circuit for directly connecting said second end of a corresponding said first reactive element to a first phase line of said second AC network; and
each said second connecting and transformer means is formed by a short circuit for directly connecting said second end of a corresponding said second reactive element to a second phase line of said second AC network.

25. An apparatus according to claim 21, wherein:
each of said AC networks comprises three phase lines; and
each said first phase voltage has a substantially 60° phase shift with respect to a corresponding said second phase voltage.

26. An apparatus according to claim 25, wherein:
said first connecting and transforming means and said second connecting and transformer means are formed by a three-phase transformer having Y-connected primary windings provided with line terminals for connection with said second AC network, first Δ-connected secondary windings having phase terminals each connected to said second end of a corresponding said first reactive element, and second Δ-connected secondary windings having phase terminals each connected to said second end of a corresponding said second reactive element.

27. An apparatus according to claim 21, wherein:

each of said AC networks comprises three phase lines; and each said first phase voltage has a substantially 120° phase shift with respect to a corresponding said second phase voltage.

28. An apparatus according to claim 27, wherein:

said first connecting and transforming means and said second connecting and transformer means are formed by a three-phase transformer having Y-connected primary windings provided with line terminals for connection with said phase lines of said second AC network, and Y-connected secondary windings having first phase terminals each connected to said second end of a corresponding said first reactive element and second phase terminals each connected to said second end of said second reactive element.

29. An apparatus according to claim 21, wherein:

each of said AC networks comprises three phase lines; and each said first phase voltage has a substantially 180° phase shift with respect to a corresponding said second phase voltage.

30. An apparatus according to claim 29, wherein:

each said first connecting and transformer means is formed by a three-phase transformer having Y-connected primary windings provided with terminals for connection with said second AC network, and Y-connected secondary windings having phase terminals each connected to said second end of a corresponding said first reactive element; and each said second connecting and transformer means is formed by a short circuit for directly connecting said second end of a corresponding said second reactive element to a phase line of said second AC network.

31. An apparatus according to claim 25, wherein:

said first connecting and transforming means and said second connecting and transformer means are formed by a transformer having three-phase Y-connected primary windings provided with line terminals for connection with said second AC network, six-phase zigzag-connected secondary windings having first phase terminals each connected to said second end of a corresponding said first reactive element, and second phase terminals each connected to said second end of a corresponding said second reactive element.

32. An apparatus according to claim 21, wherein:

each of said AC networks comprises three phase lines; and each said first phase voltage has a substantially 30° phase shift with respect to a corresponding said second phase voltage.

33. An apparatus according to claim 32, wherein:

each said first connecting and transformer means is formed by a three-phase transformer having Y-connected primary windings provided with terminals for connection with said second AC network, and Δ-connected secondary windings having phase terminals connected to said second end of a corresponding said first reactive element; and each said second connecting and transformer means is formed by a short circuit for directly connecting said second end of a corresponding said second reactive element to a phase line of said second AC network.

34. An apparatus according to claim 32, wherein:

said first connecting and transforming means and said second connecting and transformer means are formed by a three-phase transformer having Y-connected primary windings provided with line terminals for connection with said second AC network, Y and zigzag-connected secondary windings having first phase terminals each connected to said second end of a corresponding said first reactive element, and second phase terminals each connected to said second end of a corresponding said second reactive element so that each said first phase voltage is phase shifted with respect to a corresponding said second phase voltage, said first phase voltage and said second phase voltage having substantially similar amplitudes.

35. An apparatus according to claim 32, wherein:

said first connecting and transforming means and said second connecting and transformer means are formed by a Y and zigzag-connected three-phase autotransformer provided with line terminals for connection with said second AC network, said autotransformer having first phase terminals provided with tap connections each connected to said second end of a corresponding said first reactive element, and second phase terminals each connected to said second end of a corresponding said second reactive element, said second phase terminals being different from said first phase terminals so that each said first phase voltage is phase shifted with respect to a corresponding said second phase voltage, said first phase voltage and said second phase voltage having similar amplitudes.

36. An apparatus according to claim 21, wherein:

said first AC network comprises six phase lines;

said second AC network comprises six phase lines;

each said first connecting and transformer means is formed by a short circuit for directly connecting said second end of a corresponding said first reactive element to a first phase line of said second AC network; and each said second connecting and transformer means is formed by a short circuit for directly connecting said second end of a corresponding said second reactive element to a second phase line of said second AC network, said second phase line being different from said first phase line of said second AC network, each said first phase voltage having a substantially 60° phase shift with respect to a corresponding said second phase voltage.

37. An apparatus according to claim 21, wherein each of said connecting and transformer means comprises power reversal switches for switching a phase voltage applied to said second end of a corresponding said first reactive element to said second end of a corresponding said second reactive element and vice versa.

38. An apparatus according to claim 21, wherein said first reactive element and second reactive element have respectively conjugated susceptance values.

39. An apparatus according to claim 21, further comprising switches respectively in series with said reactive elements.

40. An apparatus according to claim 39, wherein said switches are sectionalizers, circuit breakers or thyristor valves.

* * * * *